United States Patent
Joseph et al.

(10) Patent No.: US 12,277,561 B2
(45) Date of Patent: Apr. 15, 2025

(54) MULTI-CRITERIA BLOCKCHAIN PROTOCOL

(71) Applicant: nChain Licensing AG, Zug (CH)

(72) Inventors: Daniel Joseph, London (GB); Andrew James Mee, London (GB); Craig Steven Wright, London (GB)

(73) Assignee: nChain Licensing AG, Zug (CH)

( * ) Notice: Subject to any disclaimer, the term of this patent is extended or adjusted under 35 U.S.C. 154(b) by 135 days.

(21) Appl. No.: 17/760,728

(22) PCT Filed: Aug. 18, 2020

(86) PCT No.: PCT/IB2020/057764
§ 371 (c)(1),
(2) Date: Mar. 15, 2022

(87) PCT Pub. No.: WO2021/053425
PCT Pub. Date: Mar. 25, 2021

(65) Prior Publication Data
US 2022/0309504 A1    Sep. 29, 2022

(30) Foreign Application Priority Data
Sep. 17, 2019 (GB) .................................... 1913385

(51) Int. Cl.
*G06Q 20/40* (2012.01)
*G06Q 20/38* (2012.01)
*H04L 9/00* (2022.01)

(52) U.S. Cl.
CPC ....... *G06Q 20/401* (2013.01); *G06Q 20/3825* (2013.01); *G06Q 20/407* (2013.01); *H04L 9/50* (2022.05); *G06Q 2220/00* (2013.01)

(58) Field of Classification Search
CPC ............. G06Q 20/401; G06Q 20/3825; G06Q 20/407; G06Q 2220/00; G06Q 20/06;
(Continued)

(56) References Cited

U.S. PATENT DOCUMENTS

2005/0071571 A1* 3/2005 Luick .................. G06F 12/0862
711/138
2019/0095879 A1* 3/2019 Eyal ..................... G06Q 20/223
(Continued)

FOREIGN PATENT DOCUMENTS

| CN | 109840767 A | * | 6/2019 |
| WO | 2018203186 | | 11/2018 |
| WO | 2019142076 | | 7/2019 |

OTHER PUBLICATIONS

"Bitcoin Developer Reference", Krzysztof Okupski, Technische University Eindhoven, Dec. 15, 2014 (Year: 2014).*
(Continued)

*Primary Examiner* — Duan Zhang
(74) *Attorney, Agent, or Firm* — Messner Reeves LLP

(57) ABSTRACT

A computer-implemented method of generating a transaction for a blockchain, the transaction being for transferring an amount of a digital asset from a first party to a second party. The method comprises generating a first transaction comprising an output locking the amount of the digital asset, the output comprising an output script comprising a plurality of criterion components each requiring a respective input data item, and a plurality of counter script components. Each criterion component is associated with one of the counter script components. The output script is configured so as to, when executed alongside an input script of a second transaction, i) increment a counter each time a respective criterion component is satisfied by a respective input data item of the input script, and ii) to require the counter to increment to at least a predetermined number in order to be unlocked by the input script.

23 Claims, 10 Drawing Sheets

(58) Field of Classification Search
CPC ........ G06Q 40/04; G06Q 20/065; H04L 9/50;
H04L 9/085; H04L 9/3255; H04L 9/3239
See application file for complete search history.

(56) References Cited

U.S. PATENT DOCUMENTS

| | | | |
|---|---|---|---|
| 2019/0156301 A1* | 5/2019 | Bentov | G06Q 20/405 |
| 2019/0160660 A1* | 5/2019 | Husain | B25J 9/1694 |
| 2019/0164221 A1* | 5/2019 | Hill | G06Q 20/405 |
| 2019/0172026 A1* | 6/2019 | Vessenes | G06Q 20/065 |

OTHER PUBLICATIONS

The Best Bitcoin Script Guide-Part 2, Blockgeek's, pp. 1-22, 2018, https://blockgeeks.com/guides/bitcoin-script-guide-part-2/.

Shamir, Adi, How to share a secret. Communications of the ACM, vol. 22, Issue 11, Nov. 1979, pp. 612-613, Communications of the ACM, Cambridge, MA.

SHA-256, BitcoinWiki, 2019, pp. 1-3, Bitcoinwiki.org, https://en.bitcoinwiki.org/wiki/SHA-256.

Script, BitcoinWiki, 2019, pp. 1-10, Bitcoinwiki.org, https://en.bitcoin.it/wiki/Script.

PCT/IB2020/057764 International Search Report and Written Opinion dated Oct. 22, 2020.

Atzei Nicola et al., A Formal Model of Bitcoin Transactions, Dec. 7, 2018, Advances in Databases and Information Systems, Springer International Publishing, pp. 541-560.

Silvia Bartolucci et al., SHARVOT: secret SHARe-based VOTing on the blockchain, arxiv.org, Cornell University Library, Mar. 13, 2018, Ithaca, NY.

GB1913385.9 Combined Search and Examination Report dated Feb. 25, 2020.

* cited by examiner

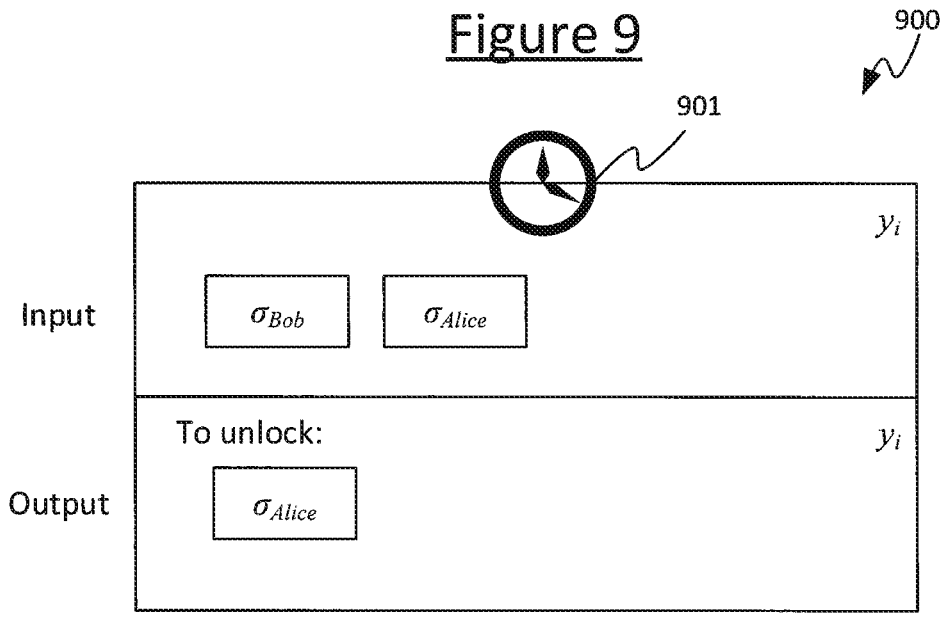
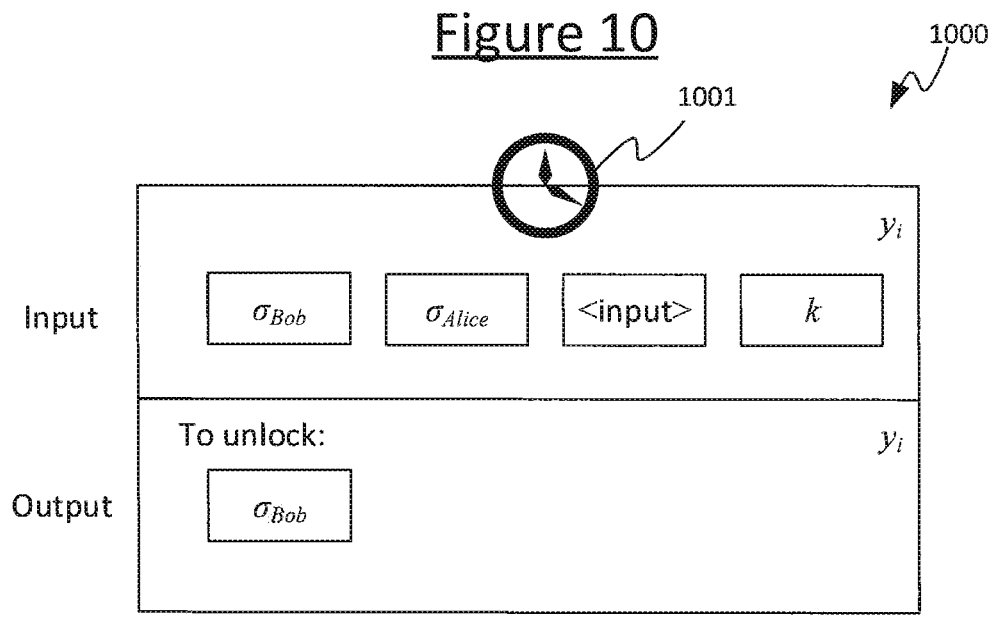

MULTI-CRITERIA BLOCKCHAIN PROTOCOL

CROSS REFERENCE TO RELATED APPLICATIONS

This application is the U.S. National Stage of International Application No. PCT/IB2020/057764 filed on Aug. 18, 2020, which claims the benefit of United Kingdom Patent Application No. 1913385.9, filed on Sep. 17, 2019, the contents of which are incorporated herein by reference in their entireties.

TECHNICAL FIELD

The present disclosure relates to methods for and transactions for implementing a blockchain protocol which requires m-of-n criteria to be satisfied in order to unlock a transaction.

BACKGROUND

A blockchain refers to a form of distributed data structure, wherein a duplicate copy of the blockchain is maintained at each of a plurality of nodes in a peer-to-peer (P2P) network. The blockchain comprises a chain of blocks of data, wherein each block comprises one or more transactions. Each transaction may point back to a preceding transaction in a sequence which may span one or more blocks. Transactions can be submitted to the network to be included in new blocks by a process known as "mining", which involves each of a plurality of mining nodes competing to perform "proof-of-work", i.e. solving a cryptographic puzzle based on a pool of the pending transactions waiting to be included in blocks.

Conventionally the transactions in the blockchain are used to convey a digital asset, i.e. data acting as a store of value. However, a blockchain can also be exploited in order to layer additional functionality on top of the blockchain. For instance, blockchain protocols may allow for storage of additional user data in an output of a transaction. Modern blockchains are increasing the maximum data capacity that can be stored within a single transaction, enabling more complex data to be incorporated. For instance, this may be used to store an electronic document in the blockchain, or even audio or video data.

Each node in the network can have any one, two or all of three roles: forwarding, mining and storage. Forwarding nodes propagate transactions throughout the nodes of the network. Mining nodes perform the mining of transactions into blocks. Storage nodes each store their own copy of the mined blocks of the blockchain. In order to have a transaction recorded in the blockchain, a party sends the transaction to one of the nodes of the network to be propagated. Mining nodes which receive the transaction may race to mine the transaction into a new block. Each node is configured to respect the same node protocol, which will include one or more conditions for a transaction to be valid. Invalid transactions will not be propagated nor mined into blocks. Assuming the transaction is validated and thereby accepted onto the blockchain, the additional user data will thus remain stored at each of the nodes in the P2P network as an immutable public record.

Some blockchain protocols use a scripting language that gives parties the ability to create advanced criteria under which a potential recipient may spend the output of a transaction. Some scripting languages include a function (sometimes referred to as an opcode) which checks whether a sufficient number of valid digital signatures are present in the input of a transaction. If the required m-of-n signatures are available, then the output can be spent.

SUMMARY

While useful, m-of-n signature checks are limited to being a check only on whether the threshold of digital signatures requested has been met. However, there may be scenarios where thresholds for other criteria that are not necessarily signatures may be required. As an example, a potential recipient may be asked to produce 'at least a specified number of hash pre-images' in order to spend the output of a transaction.

According to one aspect disclosed herein, there is provided a computer-implemented method of generating a transaction for a blockchain, the transaction being for transferring an amount of a digital asset from a first party to a second party; the method being performed by the first party and comprising: generating a first transaction comprising an output locking the amount of the digital asset, the output comprising an output script comprising a plurality of criterion components each requiring a respective input data item, and a plurality of counter script components, each criterion component being associated with one of the counter script components, and wherein the output script is configured so as to, when executed alongside an input script of a second transaction, i) increment a counter each time a respective criterion component is satisfied by a respective input data item of the input script, and ii) to require the counter to increment to at least a predetermined number in order to be unlocked by the input script.

Thus a binary threshold protocol (BTP) is provided where a threshold restriction can be applied to any type of criteria. The output script condition defines multiple criterions which can be satisfied with input data items contained in a transaction trying to spend the digital asset. Each time a criterion is satisfied, a counter is incremented (e.g. by one). If the counter has reached the predetermined number (the binary threshold) by the time all of the input data items have been used up, the first script condition will be unlocked. If the input script satisfies any other conditions of the protocol (e.g. the transaction is a valid transaction), the amount of the digital asset will be transferred to the second party). The protocol is binary in the sense that, if the threshold is reached the digital asset can be transferred (e.g. spent), whereas if the threshold is not reached the digital asset cannot be transferred.

While the BTP provides advantages, it may be desirable in some cases that the amount of the digital asset transferred to the second party is based on the number of criteria which are satisfied (e.g. more of the digital asset is transferred if more criteria are satisfied). For example, it may be desirable to transfer a first amount if an intended recipient can provide 1-of-n pre-images, a larger amount if 2-of-n pre-images are provided, and an even larger amount of 3-of-n pre-images are provided.

According to another aspect disclosed herein, there is provided a computer-implemented method of generating a transaction for a blockchain, the transaction being for transferring an amount of a digital asset from a first party to a second party, the first and second parties each being associated with the blockchain; the method being performed by the first party and comprising: generating a first transaction comprising a plurality of outputs, each output locking a respective amount of the digital asset and comprising a respective first script condition, wherein each first script condition comprises a plurality of criterion components each requiring a respective input data item, and a plurality of counter components, each criterion component being associated with one of the counter components, and wherein each first output script condition is configured so as to, when executed alongside an input script of a second transaction, i) increment a counter each time a respective criterion component is satisfied by a respective input data item of the input script, and ii) require the counter to increment to at least a respective predetermined number in order to be unlocked by that input script, and wherein one, some or all of the first script conditions require the counter to increment to a different predetermined number.

Like the BTP, in this method a spectrum threshold protocol (STP) is provided where a threshold restriction can be applied to any type of criteria. The first transaction has multiple outputs, each of which would transfer an amount of digital asset if unlocked. For example, each output may transfer a different amount of digital asset, with a first output transferring a first amount, a second output transferring a different (e.g. larger) amount, and so on. Each output has a first output script condition having multiple criteria which can be satisfied with input data items contained in a transaction trying to spend the digital asset. Each time a criterion is satisfied, a counter is incremented (e.g. by one). Some of the first output script conditions require the counter to reach a different predetermined number in order to be unlocked. That is, at least one output script will be unlocked with a lower number of satisfied criteria compared to another output script. This creates a spectrum threshold. For example, satisfying a smaller number of criteria may unlock an output which locks a smaller amount of digital asset whilst satisfying a larger number of criteria may unlock an output which locks a larger amount of digital asset.

Each individual output of a first transaction following the STP is similar to an output of a first transaction following the BTP protocol, with the predetermined number (threshold) required by the STP outputs varying amongst some or all of the outputs.

For each threshold protocol, a set of transactions are employed to enable a recipient (second party) to access the digital asset based on the number of criteria that the recipient satisfies. The STP is applicable for cases where the amount of digital asset (reward) is proportional to the number of criteria the recipient is able to satisfy, and also for cases where the reward is not proportional to the number of satisfied criteria. For instance, there may be a cap on the reward where above a certain threshold, satisfying more criteria would not increase the obtainable reward.

BRIEF DESCRIPTION OF THE DRAWINGS

To assist understanding of embodiments of the present disclosure and to show how such embodiments may be put into effect, reference is made, by way of example only, to the accompanying drawings in which:

FIG. 9 is a schematic representation of a Refund transaction;

FIG. 10 is a schematic representation of a Collect transaction;

DETAILED DESCRIPTION OF EMBODIMENTS

Example System Overview

Figure 1:
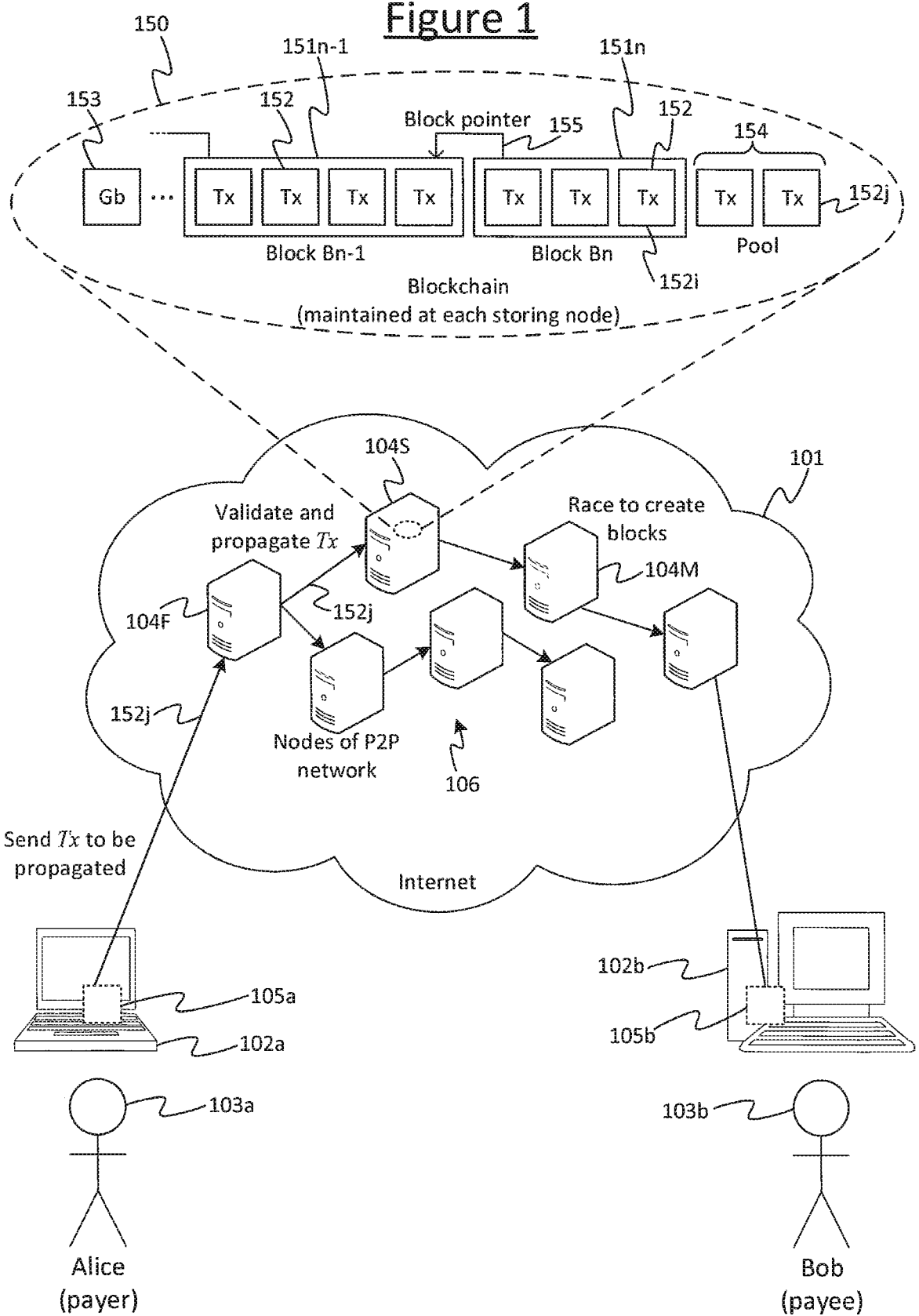
FIG. 1 is a schematic block diagram of a system for implementing a blockchain.

FIG. 1 shows an example system 100 for implementing a blockchain 150 generally. The system 100 comprises a packet-switched network 101, typically a wide-area internetwork such as the Internet. The packet-switched network 101 comprises a plurality of nodes 104 arranged to form a peer-to-peer (P2P) overlay network 106 within the packet-switched network 101. Each node 104 comprises computer equipment of a peers, with different ones of the nodes 104 belonging to different peers. Each node 104 comprises processing apparatus comprising one or more processors, e.g. one or more central processing units (CPUs), accelerator processors, application specific processors and/or field programmable gate arrays (FPGAs). Each node also comprises memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive.

The blockchain 150 comprises a chain of blocks of data 151, wherein a respective copy of the blockchain 150 is maintained at each of a plurality of nodes in the P2P network 160. Each block 151 in the chain comprises one or more transactions 152, wherein a transaction in this context refers to a kind of data structure. The nature of the data structure will depend on the type of transaction protocol used as part of a transaction model or scheme. A given blockchain will typically use one particular transaction protocol throughout. In one common type of transaction protocol, the data structure of each transaction 152 comprises at least one input and at least one output. Each output specifies an amount representing a quantity of a digital asset belonging to a user 103 to whom the output is cryptographically locked (requiring a signature of that user in order to be unlocked and thereby redeemed or spent). Each input points back to the output of a preceding transaction 152, thereby linking the transactions.

At least some of the nodes 104 take on the role of forwarding nodes 104F which forward and thereby propagate transactions 152. At least some of the nodes 104 take on the role of miners 104M which mine blocks 151. At least some of the nodes 104 take on the role of storage nodes 104S (sometimes also called "full-copy" nodes), each of which stores a respective copy of the same blockchain 150 in their respective memory. Each miner node 104M also maintains a pool 154 of transactions 152 waiting to be mined into blocks 151. A given node 104 may be a forwarding node 104, miner 104M, storage node 104S or any combination of two or all of these.

In a given present transaction 152j, the (or each) input comprises a pointer referencing the output of a preceding transaction 152i in the sequence of transactions, specifying that this output is to be redeemed or "spent" in the present transaction 152j. In general, the preceding transaction could be any transaction in the pool 154 or any block 151. The preceding transaction 152i need not necessarily exist at the time the present transaction 152j is created or even sent to the network 106, though the preceding transaction 152i will need to exist and be validated in order for the present transaction to be valid. Hence "preceding" herein refers to a predecessor in a logical sequence linked by pointers, not necessarily the time of creation or sending in a temporal sequence, and hence it does not necessarily exclude that the transactions 152i, 152j be created or sent out-of-order (see discussion below on orphan transactions). The preceding transaction 152i could equally be called the antecedent or predecessor transaction.

The input of the present transaction 152j also comprises the signature of the user 103a to whom the output of the preceding transaction 152i is locked. In turn, the output of the present transaction 152j can be cryptographically locked to a new user 103b. The present transaction 152j can thus transfer the amount defined in the input of the preceding transaction 152i to the new user 103b as defined in the output of the present transaction 152j. In some cases, a transaction 152 may have multiple outputs to split the input amount between multiple users (one of whom could be the original user 103a in order to give change). In some cases, a transaction can also have multiple inputs to gather together the amounts from multiple outputs of one or more preceding transactions, and redistribute to one or more outputs of the current transaction.

The above may be referred to as an "output-based" transaction protocol, sometimes also referred to as an unspent transaction output (UTXO) type protocol (where the outputs are referred to as UTXOs). A user's total balance is not defined in any one number stored in the blockchain, and instead the user needs a special "wallet" application 105 to collate the values of all the UTXOs of that user which are scattered throughout many different transactions 152 in the blockchain 151.

An alternative type of transaction protocol may be referred to as an "account-based" protocol, as part of an account-based transaction model. In the account-based case, each transaction does not define the amount to be transferred by referring back to the UTXO of a preceding transaction in a sequence of past transactions, but rather by reference to an absolute account balance. The current state of all accounts is stored by the miners separate to the blockchain and is updated constantly. In such a system, transactions are ordered using a running transaction tally of the account (also called the "position"). This value is signed by the sender as part of their cryptographic signature and is hashed as part of the transaction reference calculation. In addition, an optional data field may also be signed the transaction. This data field may point back to a previous transaction, for example if the previous transaction ID is included in the data field.

With either type of transaction protocol, when a user 103 wishes to enact a new transaction 152j, then he/she sends the new transaction from his/her computer terminal 102 to one of the nodes 104 of the P2P network 106 (which nowadays are typically servers or data centres, but could in principle be other user terminals). This node 104 checks whether the transaction is valid according to a node protocol which is applied at each of the nodes 104. The details of the node protocol will correspond to the type of transaction protocol being used in the blockchain 150 in question, together forming the overall transaction model. The node protocol typically requires the node 104 to check that the cryptographic signature in the new transaction 152j matches the expected signature, which depends on the previous transaction 152i in an ordered sequence of transactions 152. In an output-based case, this may comprise checking that the cryptographic signature of the user included in the input of the new transaction 152j matches a condition defined in the output of the preceding transaction 152i which the new transaction spends, wherein this condition typically comprises at least checking that the cryptographic signature in the input of the new transaction 152j unlocks the output of the previous transaction 152i to which the input of the new transaction points. In some transaction protocols the condition may be at least partially defined by a custom script included in the input and/or output. Alternatively, it could simply be a fixed by the node protocol alone, or it could be due to a combination of these. Either way, if the new transaction 152j is valid, the current node forwards it to one or more others of the nodes 104 in the P2P network 106. At least some of these nodes 104 also act as forwarding nodes 104F, applying the same test according to the same node protocol, and so forward the new transaction 152j on to one or more further nodes 104, and so forth. In this way the new transaction is propagated throughout the network of nodes 104.

In an output-based model, the definition of whether a given output (e.g. UTXO) is spent is whether it has yet been validly redeemed by the input of another, onward transaction 152j according to the node protocol. Another condition for a transaction to be valid is that the output of the preceding transition 152i which it attempts to spend or redeem has not already been spent/redeemed by another valid transaction. Again, if not valid, the transaction 152j will not be propagated or recorded in the blockchain. This guards against double-spending whereby the spender tries to spend the output of the same transaction more than once. An account-based model on the other hand guards against double-spending by maintaining an account balance. Because again there is a defined order of transactions, the account balance has a single defined state at any one time.

In addition to validation, at least some of the nodes 104M also race to be the first to create blocks of transactions in a process known as mining, which is underpinned by "proof of work". At a mining node 104M, new transactions are added to a pool of valid transactions that have not yet appeared in a block. The miners then race to assemble a new valid block 151 of transactions 152 from the pool of transactions 154 by attempting to solve a cryptographic puzzle. Typically, this comprises searching for a "nonce" value such that when the nonce is concatenated with the pool of transactions 154 and hashed, then the output of the hash meets a predetermined condition. E.g. the predetermined condition may be that the output of the hash has a certain predefined number of leading zeros. A property of a hash function is that it has an unpredictable output with respect to its input. Therefore, this search can only be performed by brute force, thus consuming a substantive amount of processing resource at each node 104M that is trying to solve the puzzle.

The first miner node 104M to solve the puzzle announces this to the network 106, providing the solution as proof which can then be easily checked by the other nodes 104 in the network (once given the solution to a hash it is straightforward to check that it causes the output of the hash to meet the condition). The pool of transactions 154 for which the winner solved the puzzle then becomes recorded as a new block 151 in the blockchain 150 by at least some of the nodes 104 acting as storage nodes 104S, based on having checked the winner's announced solution at each such node. A block pointer 155 is also assigned to the new block 151n pointing back to the previously created block 151n-1 in the chain. The proof-of-work helps reduce the risk of double spending since it takes a large amount of effort to create a new block 151, and as any block containing a double spend is likely to be rejected by other nodes 104, mining nodes 104M are incentivised not to allow double spends to be included in their blocks. Once created, the block 151 cannot be modified since it is recognized and maintained at each of the storing nodes 104S in the P2P network 106 according to the same protocol. The block pointer 155 also imposes a sequential order to the blocks 151. Since the transactions 152 are recorded in the ordered blocks at each storage node 104S in a P2P network 106, this therefore provides an immutable public ledger of the transactions.

Note that different miners 104M racing to solve the puzzle at any given time may be doing so based on different snapshots of the unmined transaction pool 154 at any given time, depending on when they started searching for a solution. Whoever solves their respective puzzle first defines which transactions 152 are included in the next new block 151n, and the current pool 154 of unmined transactions is updated. The miners 104M then continue to race to create a block from the newly defined outstanding pool 154, and so forth. A protocol also exists for resolving any "fork" that may arise, which is where two miners 104M solve their puzzle within a very short time of one another such that a conflicting view of the blockchain gets propagated. In short, whichever prong of the fork grows the longest becomes the definitive blockchain 150.

In most blockchains the winning miner 104M is automatically rewarded with a special kind of new transaction which creates a new quantity of the digital asset out of nowhere (as opposed to normal transactions which transfer an amount of the digital asset from one user to another). Hence the winning node is said to have "mined" a quantity of the digital asset. This special type of transaction is sometime referred to as a "generation" transaction. It automatically forms part of the new block 151n. This reward gives an incentive for the miners 104M to participate in the proof-of-work race. Often a regular (non-generation) transaction 152 will also specify an additional transaction fee in one of its outputs, to further reward the winning miner 104M that created the block 151n in which that transaction was included.

Due to the computational resource involved in mining, typically at least each of the miner nodes 104M takes the form of a server comprising one or more physical server units, or even whole a data centre. Each forwarding node 104M and/or storage node 104S may also take the form of a server or data centre. However, in principle any given node 104 could take the form of a user terminal or a group of user terminals networked together.

The memory of each node 104 stores software configured to run on the processing apparatus of the node 104 in order to perform its respective role or roles and handle transactions 152 in accordance with the node protocol. It will be understood that any action attributed herein to a node 104 may be performed by the software run on the processing apparatus of the respective computer equipment. Also, the term "blockchain" as used herein is a generic term that refers to the kind of technology in general, and does not limit to any particular proprietary blockchain, protocol or service.

Also connected to the network 101 is the computer equipment 102 of each of a plurality of parties 103 in the role of consuming users. These act as payers and payees in transactions but do not necessarily participate in mining or propagating transactions on behalf of other parties. They do not necessarily run the mining protocol. Two parties 103 and their respective equipment 102 are shown for illustrative purposes: a first party 103a and his/her respective computer equipment 102a, and a second party 103b and his/her respective computer equipment 102b. It will be understood that many more such parties 103 and their respective computer equipment 102 may be present and participating in the system, but for convenience they are not illustrated. Each party 103 may be an individual or an organization. Purely by way of illustration the first party 103a is referred to herein as Alice and the second party 103b is referred to as Bob, but it will be appreciated that this is not limiting and any reference herein to Alice or Bob may be replaced with "first party" and "second party" respectively.

The computer equipment 102 of each party 103 comprises respective processing apparatus comprising one or more processors, e.g. one or more CPUs, GPUs, other accelerator processors, application specific processors, and/or FPGAs. The computer equipment 102 of each party 103 further comprises memory, i.e. computer-readable storage in the form of a non-transitory computer-readable medium or media. This memory may comprise one or more memory units employing one or more memory media, e.g. a magnetic medium such as hard disk; an electronic medium such as an SSD, flash memory or EEPROM; and/or an optical medium such as an optical disc drive. The memory on the computer equipment 102 of each party 103 stores software comprising a respective instance of at least one client application 105 arranged to run on the processing apparatus. It will be understood that any action attributed herein to a given party 103 may be performed using the software run on the processing apparatus of the respective computer equipment 102. The computer equipment 102 of each party 103 comprises at least one user terminal, e.g. a desktop or laptop computer, a tablet, a smartphone, or a wearable device such as a smartwatch. The computer equipment 102 of a given party 103 may also comprise one or more other networked resources, such as cloud computing resources accessed via the user terminal.

The client application or software 105 may be initially provided to the computer equipment 102 of any given party 103 on suitable computer-readable storage medium or media, e.g. downloaded from a server, or provided on a removable storage device such as a removable SSD, flash memory key, removable EEPROM, removable magnetic disk drive, magnetic floppy disk or tape, optical disk such as a CD or DVD ROM, or a removable optical drive, etc.

The client application 105 comprises at least a "wallet" function. This has two main functionalities. One of these is to enable the respective user party 103 to create, sign and send transactions 152 to be propagated throughout the network of nodes 104 and thereby included in the blockchain 150. The other is to report back to the respective party the amount of the digital asset that he or she currently owns. In an output-based system, this second functionality comprises collating the amounts defined in the outputs of the various 152 transactions scattered throughout the blockchain 150 that belong to the party in question.

The instance of the client application 105 on each computer equipment 102 is operatively coupled to at least one of the forwarding nodes 104F of the P2P network 106. This enables the wallet function of the client 105 to send transactions 152 to the network 106. The client 105 is also able to contact one, some or all of the storage nodes 104 in order to query the blockchain 150 for any transactions of which the respective party 103 is the recipient (or indeed inspect other parties' transactions in the blockchain 150, since in embodiments the blockchain 150 is a public facility which provides trust in transactions in part through its public visibility). The wallet function on each computer equipment 102 is configured to formulate and send transactions 152 according to a transaction protocol. Each node 104 runs software configured to validate transactions 152 according to a node protocol, and in the case of the forwarding nodes 104F to forward transactions 152 in order to propagate them throughout the network 106. The transaction protocol and node protocol correspond to one another, and a given transaction protocol goes with a given node protocol, together implementing a given transaction model. The same transaction protocol is used for all transactions 152 in the blockchain 150 (though the transaction protocol may allow different subtypes of transaction within it). The same node protocol is used by all the nodes 104 in the network 106 (though it many handle different subtypes of transaction differently in accordance with the rules defined for that subtype, and also different nodes may take on different roles and hence implement different corresponding aspects of the protocol).

As mentioned, the blockchain 150 comprises a chain of blocks 151, wherein each block 151 comprises a set of one or more transactions 152 that have been created by a proof-of-work process as discussed previously. Each block 151 also comprises a block pointer 155 pointing back to the previously created block 151 in the chain so as to define a sequential order to the blocks 151. The blockchain 150 also comprises a pool of valid transactions 154 waiting to be included in a new block by the proof-of-work process. Each transaction 152 (other than a generation transaction) comprises a pointer back to a previous transaction so as to define an order to sequences of transactions (N.B. sequences of transactions 152 are allowed to branch). The chain of blocks 151 goes all the way back to a genesis block (Gb) 153 which was the first block in the chain. One or more original transactions 152 early on in the chain 150 pointed to the genesis block 153 rather than a preceding transaction.

When a given party 103, say Alice, wishes to send a new transaction 152j to be included in the blockchain 150, then she formulates the new transaction in accordance with the relevant transaction protocol (using the wallet function in her client application 105). She then sends the transaction 152 from the client application 105 to one of the one or more forwarding nodes 104F to which she is connected. E.g. this could be the forwarding node 104F that is nearest or best connected to Alice's computer 102. When any given node 104 receives a new transaction 152j, it handles it in accordance with the node protocol and its respective role. This comprises first checking whether the newly received transaction 152j meets a certain condition for being "valid", examples of which will be discussed in more detail shortly. In some transaction protocols, the condition for validation may be configurable on a per-transaction basis by scripts included in the transactions 152. Alternatively, the condition could simply be a built-in feature of the node protocol, or be defined by a combination of the script and the node protocol.

On condition that the newly received transaction 152j passes the test for being deemed valid (i.e. on condition that it is "validated"), any storage node 104S that receives the transaction 152j will add the new validated transaction 152 to the pool 154 in the copy of the blockchain 150 maintained at that node 104S. Further, any forwarding node 104F that receives the transaction 152j will propagate the validated transaction 152 onward to one or more other nodes 104 in the P2P network 106. Since each forwarding node 104F applies the same protocol, then assuming the transaction 152j is valid, this means it will soon be propagated throughout the whole P2P network 106.

Once admitted to the pool 154 in the copy of the blockchain 150 maintained at one or more storage nodes 104, then miner nodes 104M will start competing to solve the proof-of-work puzzle on the latest version of the pool 154 including the new transaction 152 (other miners 104M may still be trying to solve the puzzle based on the old view of the pool 154, but whoever gets there first will define where the next new block 151 ends and the new pool 154 starts, and eventually someone will solve the puzzle for a part of the pool 154 which includes Alice's transaction 152j). Once the proof-of-work has been done for the pool 154 including the new transaction 152j, it immutably becomes part of one of the blocks 151 in the blockchain 150. Each transaction 152 comprises a pointer back to an earlier transaction, so the order of the transactions is also immutably recorded.

Figure 2:
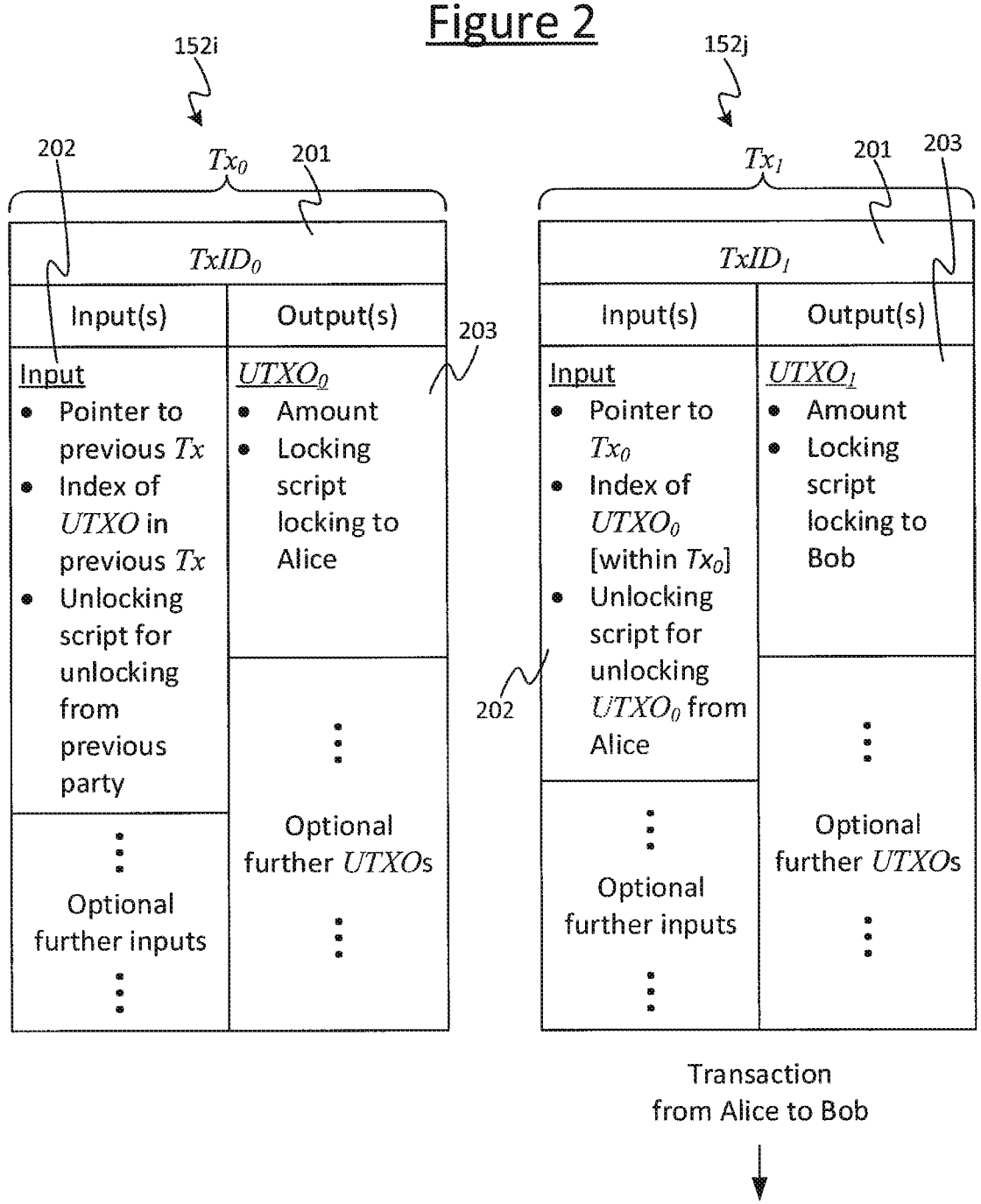
FIG. 2 schematically illustrates some examples of transactions which may be recorded in a blockchain.

FIG. 2 illustrates an example transaction protocol. This is an example of an UTXO-based protocol. A transaction 152 (abbreviated "Tx") is the fundamental data structure of the blockchain 150 (each block 151 comprising one or more transactions 152). The following will be described by reference to an output-based or "UTXO" based protocol. However, this not limiting to all possible embodiments.

In a UTXO-based model, each transaction ("Tx") 152 comprises a data structure comprising one or more inputs 202, and one or more outputs 203. Each output 203 may comprise an unspent transaction output (UTXO), which can be used as the source for the input 202 of another new transaction (if the UTXO has not already been redeemed). The UTXO specifies an amount of a digital asset (a store of value). It may also contain the transaction ID of the transaction from which it came, amongst other information. The transaction data structure may also comprise a header 201, which may comprise an indicator of the size of the input field(s) 202 and output field(s) 203. The header 201 may also include an ID of the transaction. In embodiments the transaction ID is the hash of the transaction data (excluding the transaction ID itself) and stored in the header 201 of the raw transaction 152 submitted to the miners 104M.

Say Alice 103a wishes to create a transaction 152j transferring an amount of the digital asset in question to Bob 103b. In FIG. 2 Alice's new transaction 152j is labelled "$Tx_1$". It takes an amount of the digital asset that is locked to Alice in the output 203 of a preceding transaction 152i in the sequence, and transfers at least some of this to Bob. The preceding transaction 152i is labelled "$Tx_0$" in FIG. 2. $Tx_0$ and $Tx_1$ are just arbitrary labels. They do not necessarily mean that $Tx_0$ is the first transaction in the blockchain 151, nor that $Tx_1$ is the immediate next transaction in the pool 154. Tx$_1$ could point back to any preceding (i.e. antecedent) transaction that still has an unspent output 203 locked to Alice.

The preceding transaction Tx$_0$ may already have been validated and included in the blockchain 150 at the time when Alice creates her new transaction Tx$_1$, or at least by the time she sends it to the network 106. It may already have been included in one of the blocks 151 at that time, or it may be still waiting in the pool 154 in which case it will soon be included in a new block 151. Alternatively, Tx$_0$ and Tx$_1$ could be created and sent to the network 102 together, or Tx$_0$ could even be sent after Tx$_1$ if the node protocol allows for buffering "orphan" transactions. The terms "preceding" and "subsequent" as used herein in the context of the sequence of transactions refer to the order of the transactions in the sequence as defined by the transaction pointers specified in the transactions (which transaction points back to which other transaction, and so forth). They could equally be replaced with "predecessor" and "successor", or "antecedent" and "descendant", "parent" and "child", or such like. It does not necessarily imply an order in which they are created, sent to the network 106, or arrive at any given node 104. Nevertheless, a subsequent transaction (the descendent transaction or "child") which points to a preceding transaction (the antecedent transaction or "parent") will not be validated until and unless the parent transaction is validated. A child that arrives at a node 104 before its parent is considered an orphan. It may be discarded or buffered for a certain time to wait for the parent, depending on the node protocol and/or miner behaviour.

One of the one or more outputs 203 of the preceding transaction Tx$_0$ comprises a particular UTXO, labelled here UTXO$_0$. Each UTXO comprises a value specifying an amount of the digital asset represented by the UTXO, and a locking script which defines a condition which must be met by an unlocking script in the input 202 of a subsequent transaction in order for the subsequent transaction to be validated, and therefore for the UTXO to be successfully redeemed. Typically, the locking script locks the amount to a particular party (the beneficiary of the transaction in which it is included). I.e. the locking script defines an unlocking condition, typically comprising a condition that the unlocking script in the input of the subsequent transaction comprises the cryptographic signature of the party to whom the preceding transaction is locked.

The locking script (aka scriptPubKey) is a piece of code written in the domain specific language recognized by the node protocol. A particular example of such a language is called "Script" (capital S). The locking script specifies what information is required to spend a transaction output 203, for example the requirement of Alice's signature. Unlocking scripts appear in the outputs of transactions. The unlocking script (aka scriptSig) is a piece of code written the domain specific language that provides the information required to satisfy the locking script criteria. For example, it may contain Bob's signature. Unlocking scripts appear in the input 202 of transactions.

So, in the example illustrated, UTXO$_0$ in the output 203 of Tx$_0$ comprises a locking script [Checksig P$_A$] which requires a signature Sig P$_A$ of Alice in order for UTXO$_0$ to be redeemed (strictly, in order for a subsequent transaction attempting to redeem UTXO$_0$ to be valid). [Checksig P$_A$] contains the public key P$_A$ from a public-private key pair of Alice. The input 202 of Tx$_1$ comprises a pointer pointing back to Tx$_1$ (e.g. by means of its transaction ID, TxID$_0$, which in embodiments is the hash of the whole transaction Tx$_0$). The input 202 of Tx$_1$ comprises an index identifying UTXO$_0$ within Tx$_0$, to identify it amongst any other possible outputs of Tx$_0$. The input 202 of Tx$_1$ further comprises an unlocking script <Sig P$_A$>which comprises a cryptographic signature of Alice, created by Alice applying her private key from the key pair to a predefined portion of data (sometimes called the "message" in cryptography). What data (or "message") needs to be signed by Alice to provide a valid signature may be defined by the locking script, or by the node protocol, or by a combination of these.

When the new transaction Tx$_1$ arrives at a node 104, the node applies the node protocol. This comprises running the locking script and unlocking script together to check whether the unlocking script meets the condition defined in the locking script (where this condition may comprise one or more criteria). In embodiments this involves concatenating the two scripts:

$$<Sig\ P_A><P_A>|\ |[Checksig\ P_A]$$

where "| ||" represents a concatenation and "< . . . >" means place the data on the stack, and "[ . . . ]" is a function comprised by the unlocking script (in this example a stack-based language). Equivalently the scripts may be run one after another, with a common stack, rather than concatenating the scripts. Either way, when run together, the scripts use the public key P$_A$ of Alice, as included in the locking script in the output of Tx$_0$, to authenticate that the locking script in the input of Tx$_1$ contains the signature of Alice signing the expected portion of data. The expected portion of data itself (the "message") also needs to be included in Tx$_0$ order to perform this authentication. In embodiments the signed data comprises the whole of Tx$_0$ (so a separate element does to need to be included specifying the signed portion of data in the clear, as it is already inherently present).

The details of authentication by public-private cryptography will be familiar to a person skilled in the art. Basically, if Alice has signed a message by encrypting it with her private key, then given Alice's public key and the message in the clear (the unencrypted message), another entity such as a node 104 is able to authenticate that the encrypted version of the message must have been signed by Alice. Signing typically comprises hashing the message, signing the hash, and tagging this onto the clear version of the message as a signature, thus enabling any holder of the public key to authenticate the signature.

If the unlocking script in Tx$_1$ meets the one or more conditions specified in the locking script of Tx$_0$ (so in the example shown, if Alice's signature is provided in Tx$_1$ and authenticated), then the node 104 deems Tx$_1$ valid. If it is a mining node 104M, this means it will add it to the pool of transactions 154 awaiting proof-of-work. If it is a forwarding node 104F, it will forward the transaction Tx$_1$ to one or more other nodes 104 in the network 106, so that it will be propagated throughout the network. Once Tx$_1$ has been validated and included in the blockchain 150, this defines UTXO$_0$ from Tx$_0$ as spent. Note that Tx$_1$ can only be valid if it spends an unspent transaction output 203. If it attempts to spend an output that has already been spent by another transaction 152, then Tx$_1$ will be invalid even if all the other conditions are met. Hence the node 104 also needs to check whether the referenced UTXO in the preceding transaction Tx$_0$ is already spent (has already formed a valid input to another valid transaction). This is one reason why it is important for the blockchain 150 to impose a defined order on the transactions 152. In practice a given node 104 may maintain a separate database marking which UTXOs 203 in which transactions 152 have been spent, but ultimately what defines whether a UTXO has been spent is whether it has already formed a valid input to another valid transaction in the blockchain 150.

Note that in UTXO-based transaction models, a given UTXO needs to be spent as a whole. It cannot "leave behind" a fraction of the amount defined in the UTXO as spent while another fraction is spent. However, the amount from the UTXO can be split between multiple outputs of the next transaction. E.g. the amount defined in $UTXO_0$ in $Tx_0$ can be split between multiple UTXOs in $Tx_1$. Hence if Alice does not want to give Bob all of the amount defined in $UTXO_0$, she can use the remainder to give herself change in a second output of $Tx_1$ or pay another party.

In practice Alice will also usually need to include a fee for the winning miner, because nowadays the reward of the generation transaction alone is not typically sufficient to motivate mining. If Alice does not include a fee for the miner, $Tx_0$ will likely be rejected by the miner nodes 104M, and hence although technically valid, it will still not be propagated and included in the blockchain 150 (the miner protocol does not force miners 104M to accept transactions 152 if they don't want). In some protocols, the mining fee does not require its own separate output 203 (i.e. does not need a separate UTXO). Instead any different between the total amount pointed to by the input(s) 202 and the total amount of specified in the output(s) 203 of a given transaction 152 is automatically given to the winning miner 104. E.g. say a pointer to $UTXO_0$ is the only input to $Tx_1$, and $Tx_1$ has only one output $UTXO_1$. If the amount of the digital asset specified in $UTXO_0$ is greater than the amount specified in $UTXO_1$, then the difference automatically goes to the winning miner 104M. Alternatively or additionally however, it is not necessarily excluded that a miner fee could be specified explicitly in its own one of the UTXOs 203 of the transaction 152.

Note also that if the total amount specified in all the outputs 203 of a given transaction 152 is greater than the total amount pointed to by all its inputs 202, this is another basis for invalidity in most transaction models. Therefore, such transactions will not be propagated nor mined into blocks 151.

Alice and Bob's digital assets consist of the unspent UTXOs locked to them in any transactions 152 anywhere in the blockchain 150. Hence typically, the assets of a given party 103 are scattered throughout the UTXOs of various transactions 152 throughout the blockchain 150. There is no one number stored anywhere in the blockchain 150 that defines the total balance of a given party 103. It is the role of the wallet function in the client application 105 to collate together the values of all the various UTXOs which are locked to the respective party and have not yet been spent in another onward transaction. It can do this by querying the copy of the blockchain 150 as stored at any of the storage nodes 104S, e.g. the storage node 104S that is closest or best connected to the respective party's computer equipment 102.

Note that the script code is often represented schematically (i.e. not the exact language). For example, one may write [Checksig $P_A$] to mean [Checksig $P_A$]=OP_DUP OP_HASH160<H(Pa)>OP_EQUALVERIFY OP_CHECK-SIG. "OP_. . . " refers to a particular opcode of the Script language. OP_CHECKSIG (also called "Checksig") is a Script opcode that takes two inputs (signature and public key) and verifies the signature's validity using the Elliptic Curve Digital Signature Algorithm (ECDSA). At runtime, any occurrences of signature ('sig') are removed from the script but additional requirements, such as a hash puzzle, remain in the transaction verified by the 'sig' input. As another example, OP_RETURN is an opcode of the Script language for creating an unspendable output of a transaction that can store metadata within the transaction, and thereby record the metadata immutably in the blockchain 150. E.g. the metadata could comprise a document which it is desired to store in the blockchain.

The signature $P_A$ is a digital signature. In embodiments this is based on the ECDSA using the elliptic curve secp256k1. A digital signature signs a particular piece of data. In embodiments, for a given transaction the signature will sign part of the transaction input, and all or part of the transaction output. The particular parts of the outputs it signs depends on the SIGHASH flag. The SIGHASH flag is a 4-byte code included at the end of a signature to select which outputs are signed (and thus fixed at the time of signing).

The locking script is sometimes called "scriptPubKey" referring to the fact that it comprises the public key of the party to whom the respective transaction is locked. The unlocking script is sometimes called "scriptSig" referring to the fact that it supplies the corresponding signature. However, more generally it is not essential in all applications of a blockchain 150 that the condition for a UTXO to be redeemed comprises authenticating a signature. More generally the scripting language could be used to define any one or more conditions. Hence the more general terms "locking script" and "unlocking script" may be preferred.

Optional Side Channel

Figure 3:
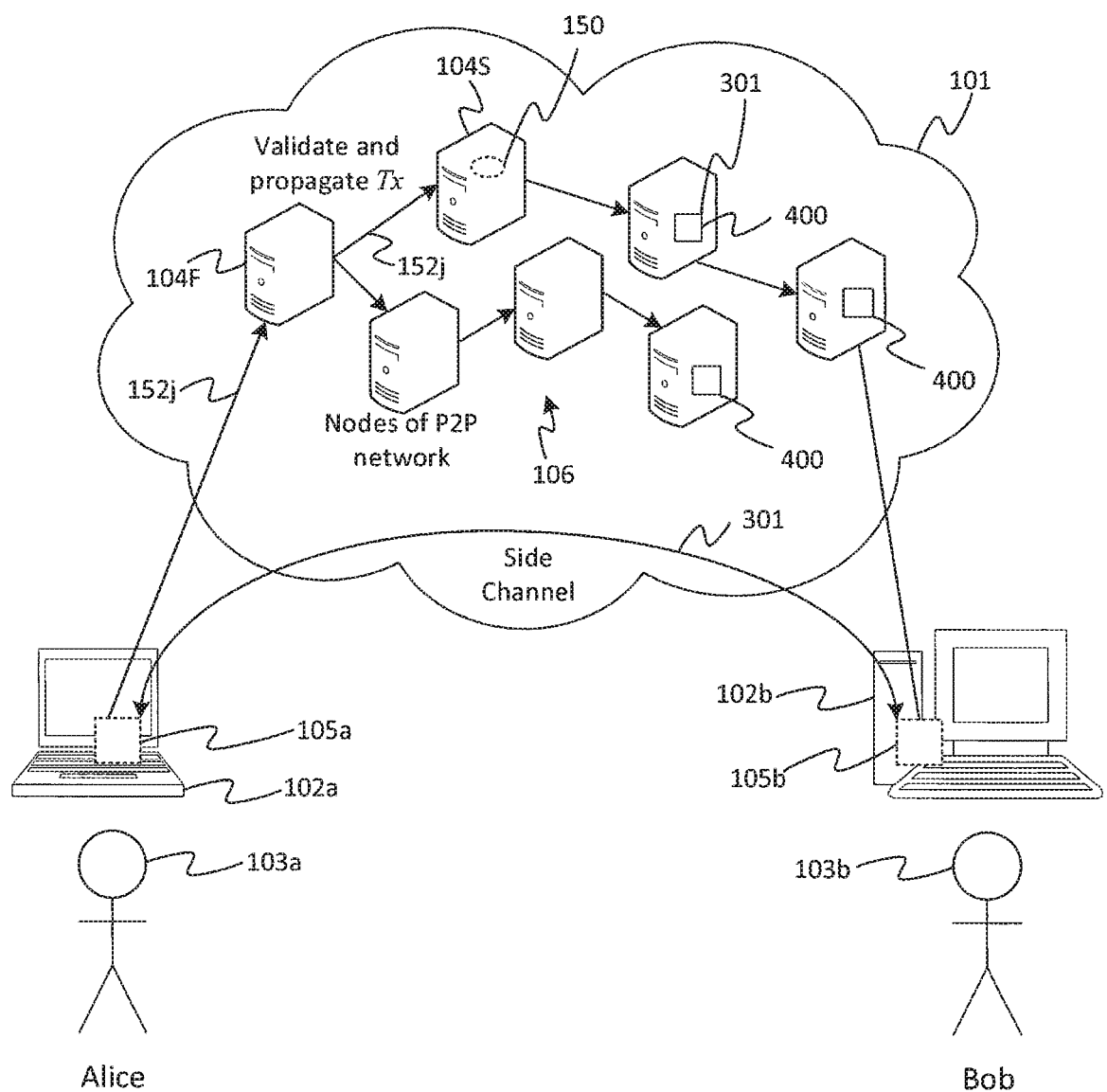
FIG. 3 is a schematic block diagram of another system for implementing a blockchain.

FIG. 3 shows a further system 100 for implementing a blockchain 150. The system 100 is substantially the same as that described in relation to FIG. 1 except that additional communication functionality is involved. The client application on each of Alice and Bob's computer equipment 102a, 120b, respectively, comprises additional communication functionality. That is, it enables Alice 103a to establish a separate side channel 301 with Bob 103b (at the instigation of either party or a third party). The side channel 301 enables exchange of data separately from the P2P network. Such communication is sometimes referred to as "off-chain". For instance, this may be used to exchange a transaction 152 between Alice and Bob without the transaction (yet) being published onto the network P2P 106 or making its way onto the chain 150, until one of the parties chooses to broadcast it to the network 106. Alternatively, or additionally, the side channel 301 may be used to exchange any other transaction related data, such as keys, negotiated amounts or terms, data content, etc.

The side channel 301 may be established via the same packet-switched network 101 as the P2P overlay network 106. Alternatively, or additionally, the side channel 301 may be established via a different network such as a mobile cellular network, or a local area network such as a local wireless network, or even a direct wired or wireless link between Alice and Bob's devices 1021, 102b. Generally, the side channel 301 as referred to anywhere herein may comprise any one or more links via one or more networking technologies or communication media for exchanging data "off-chain", i.e. separately from the P2P overlay network 106. Where more than one link is used, then the bundle or collection of off-chain links as a whole may be referred to as the side channel 301. Note therefore that if it is said that Alice and Bob exchange certain pieces of information or data, or such like, over the side channel 301, then this does not necessarily imply all these pieces of data have to be send over exactly the same link or even the same type of network.

Node Software

Figure 4:
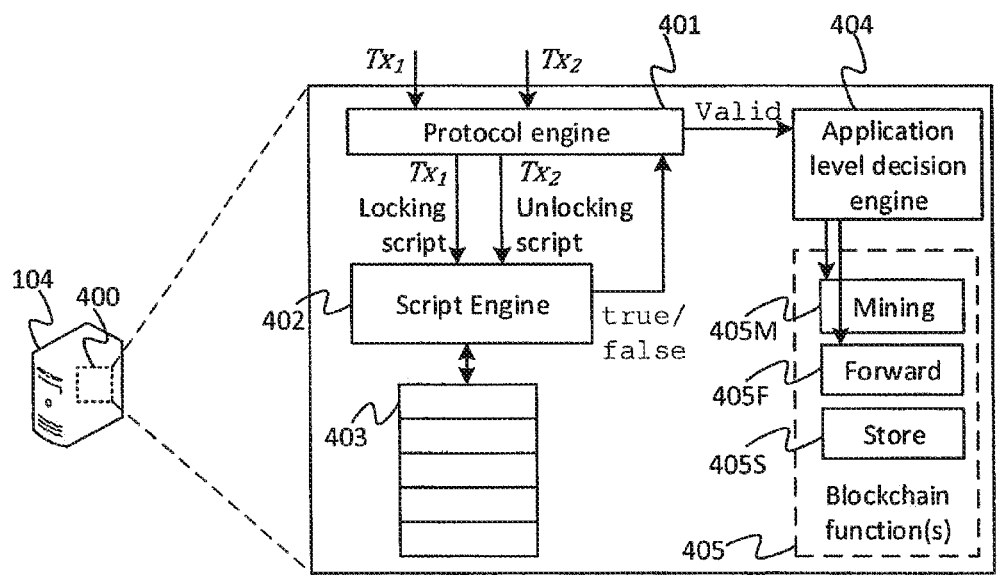
FIG. 4 is a schematic block diagram of a piece of node software for processing transactions in accordance with a node protocol of an output-based model.

FIG. 4 illustrates an example of the node software 400 that is run on each node 104 of the P2P network 106, in the example of a UTXO- or output-based model. The node software 400 comprises a protocol engine 401, a script engine 402, a stack 403, an application-level decision engine 404, and a set of one or more blockchain-related functional modules 405. At any given node 104, these may include any one, two or all three of: a mining module 405M, a forwarding module 405F and a storing module 405S (depending on the role or roles of the node). The protocol engine 401 is configured to recognize the different fields of a transaction 152 and process them in accordance with the node protocol. When a transaction $152m$ ($Tx_m$) is received having an input pointing to an output (e.g. UTXO) of another, preceding transaction $152m-1$ ($Tx_{m-1}$), then the protocol engine 401 identifies the unlocking script in $Tx_m$ and passes it to the script engine 402. The protocol engine 401 also identifies and retrieves $Tx_{m-1}$ based on the pointer in the input of $Tx_m$. It may retrieve $Tx_{m-1}$ from the respective node's own pool 154 of pending transactions if $Tx_{m-1}$ is not already on the blockchain 150, or from a copy of a block 151 in the blockchain 150 stored at the respective node or another node 104 if $Tx_{m-1}$ is already on the blockchain 150. Either way, the script engine 401 identifies the locking script in the pointed-to output of $Tx_{m-1}$ and passes this to the script engine 402.

The script engine 402 thus has the locking script of $Tx_{m-1}$ and the unlocking script from the corresponding input of $Tx_m$. For example, $Tx_1$ and $Tx_2$ are illustrated in FIG. 4, but the same could apply for any pair of transactions, such as $Tx_0$ and $Tx_1$, etc. The script engine 402 runs the two scripts together as discussed previously, which will include placing data onto and retrieving data from the stack 403 in accordance with the stack-based scripting language being used (e.g. Script).

By running the scripts together, the script engine 402 determines whether the unlocking script meets the one or more criteria defined in the locking script—i.e. does it "unlock" the output in which the locking script is included? The script engine 402 returns a result of this determination to the protocol engine 401. If the script engine 402 determines that the unlocking script does meet the one or more criteria specified in the corresponding locking script, then it returns the result "true". Otherwise it returns the result "false".

In an output-based model, the result "true" from the script engine 402 is one of the conditions for validity of the transaction. Typically there are also one or more further, protocol-level conditions evaluated by the protocol engine 401 that must be met as well; such as that the total amount of digital asset specified in the output(s) of $Tx_m$ does not exceed the total amount pointed to by the input(s), and that the pointed-to output of $Tx_{m-1}$ has not already been spent by another valid transaction. The protocol engine 401 evaluates the result from the script engine 402 together with the one or more protocol-level conditions, and only if they are all true does it validate the transaction $Tx_m$. The protocol engine 401 outputs an indication of whether the transaction is valid to the application-level decision engine 404. Only on condition that $Tx_m$ is indeed validated, the decision engine 404 may select to control one or both of the mining module 405M and the forwarding module 405F to perform their respective blockchain-related function in respect of $Tx_m$. This may comprise the mining module 405M adding $Tx_m$ to the node's respective pool 154 for mining into a block 151, and/or the forwarding module 405F forwarding $Tx_m$ to another node 104 in the P2P network 106. Note however that in embodiments, while the decision engine 404 will not select to forward or mine an invalid transaction, this does not necessarily mean that, conversely, it is obliged to trigger the mining or the forwarding of a valid transaction simply because it is valid. Optionally, in embodiments the decision engine 404 may apply one or more additional conditions before triggering either or both functions. E.g. if the node is a mining node 104M, the decision engine may only select to mine the transaction on condition that the transaction is both valid and leaves enough of a mining fee.

Note also that the terms "true" and "false" herein do not necessarily limit to returning a result represented in the form of only a single binary digit (bit), though that is certainly one possible implementation. More generally, "true" can refer to any state indicative of a successful or affirmative outcome, and "false" can refer to any state indicative of an unsuccessful or non-affirmative outcome. For instance in an account-based model (not illustrated in FIG. 4), a result of "true" could be indicated by a combination of an implicit, protocol-level) validation of a signature by the node 104 and an additional affirmative output of a smart contract (the overall result being deemed to signal true if both individual outcomes are true).

SCRIPT

Blockchain protocols may use a scripting language for transactions. A script is essentially a list of elements, which may be data or instructions. The instructions are referred to in the literature as, script words, opcodes, commands, or functions. Opcodes (short for operation codes) perform predefined operations on the data within a script. The data within a script may be, for example, numbers, public keys, signatures, hash values, etc. An opcode is a function that operates on the data within a script. In scripting language, a script is run from one end to the other (usually from left to right) and makes use of a data structure referred to as a "stack". Data is always pushed to (i.e. placed on) the stack. An opcode can pop data off the stack (i.e. take data from the stack), perform an operation on the data, and then optionally "push" new data on to the stack. The stack-based scripting language commonly used in a number of blockchains is just called Script. The following will be described in terms of opcodes of the Script language.

Stack-based scripting languages will be familiar to the person skilled in the art. The following example illustrates an example script implementation. Specifically, an example verification and unlocking process is shown.

An example script may comprise <Bob's signature> <Bob's public key> OP_DUP OP_HASH <Bob's public address> OP_EQUALVERIFY OP_CHECKSIG. The script is operated on from left to right.

Step 1: Push <Bob's signature> on to the stack

| <Bob's signature> |
|---|

Step 2: Push <Bob's public key> on to the stack (this is now the top element on the stack)

| <Bob's public key> |
|---|
| <Bob's signature> |

Step 3: The OP_DUP opcode operates on the top element on the stack to duplicate <Bob's public key>.

```
<Bob's public key>
<Bob's public key>
<Bob's signature>
```

Step 4: The OP_HASH opcode pops out <Bob's public key> and runs it through a hash algorithm (followed by one or more optional operations) to get <Bob's public address> and place it on the stack.

```
<Bob's public address>
<Bob's public key>
<Bob's signature>
```

Step 5: Push <Bob's public address> to the stack (this is now the top element on the stack).

```
<Bob's public address>
<Bob's public address>
<Bob's public key>
<Bob's signature>
```

Step 6: The OP_EQUALVERIFY opcode pops the last two elements off the stack (<Bob's public address> and <Bob's public address>) and checks to see if the two addresses are identical or not. If they are not identical the execution is considered as failed. If the condition is TRUE, the next command gets executed.

```
<Bob's public key>
<Bob's signature>
```

Step 7: The OP_CHECKSIG opcode pops out <Bob's public key> and <Bob's signature> and checks to see their validity. When this process is complete, Bob can unlock the transaction and access the specified amount of digital asset.

```
TRUE
```

For brevity, the opcodes used herein will be ones of the Script language, e.g. "OP_CHECKSIG". However, the disclosure is not limited to opcodes of the Script language. More generally, while embodiments will be described in terms of opcodes of a specific blockchain scripting language (Script), the same teaching can be implemented using any opcode of any scripting language which when called by a script engine (e.g. a script interpreter) performs a particular function. Also while embodiments below may be exemplified in terms of an elliptic curve digital signature algorithm (ECDSA), it will be appreciated that other cryptographic signature schemes such as RSA are known in the art and could equally be employed herein.

Binary Threshold Protocol

An example of a threshold based unlocking system is that of the multi-signature functionality of some blockchain protocols. Within some blockchain protocols, it is possible to construct a transaction locking script that can be unlocked by providing any m-of-n ECDSA signatures corresponding to m previously specified public keys. The locking script condition for such a multi-signature transaction is written as

```
m <P₁> <P₂> ... <Pₙ₋₁> <Pₙ> n OP_CHECKMULTISIG
```

Here the locking scripts begins with the number of valid signatures that are required (m), then lists the set of n public keys for which m signatures must correspond, then the value n, and the opcode OP_CHECKMULTISIG that checks if all m signatures are valid.

The unlocking script would be of the following form.

```
0 <sigPₐ>...<sigPₘ>
```

This includes the m signatures as well as a placeholder value 0. The placeholder is not processed per se, it is only required due to an existing bug in a current implementation of a particular blockchain protocol.

Embodiments of the present disclosure provide techniques for constructing a transaction locking script (referred to synonymously as an output script or scriptPubKey) that can be unlocked by providing, in an unlocking script (referred to synonymously as an input script of scriptSig) of a later transaction, data items that satisfy any m-of-n criteria. Like OP_CHECKMULTISIG, the criteria may require signatures corresponding to public keys. However, the following techniques are not limited to requiring signatures. In general, any criteria may be defined. For instance, there may be a requirement to provide a pre-image to a hash, a solution to an equation, an answer to a quiz question, and so on.

Figure 5:
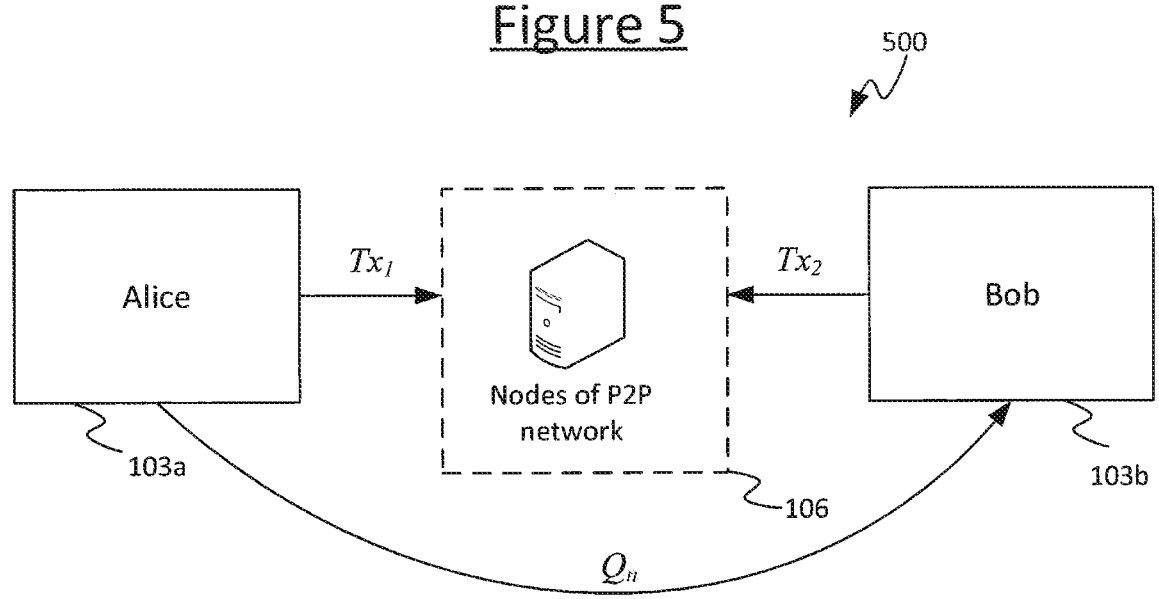
FIG. 5 is a simplified version of FIG. 1 and schematically represents a system for implementing generic criteria threshold blockchain transactions.

Embodiments will first be described with reference to FIG. 5. FIG. 5 is a simplified version of FIG. 1 and illustrates an example system 500 for implementing a Binary Threshold Protocol (BTP). A first party (Alice) 103a generates a transaction Tx/and transmits the first transaction $Tx_1$ to the blockchain network 106. Assuming the blockchain protocol is satisfied, the first transaction $Tx_1$ will be included in the blockchain 150. Note that instead, a different party could transmit Alice's transaction to the blockchain network 106 on her behalf. The first transaction $Tx_1$ comprises an output which specifies an amount of a digital asset. The digital asset is locked by an output script (or locking script). In order to be unlocked and transferred to a second party (Bob) 103b, Bob must transmit a second transaction $Tx_2$ to the blockchain network 106 which has an input script (or unlocking script) which can unlock the output script of the first transaction $Tx_1$.

When constructing the output script, Alice 103a includes a plurality of criterion components. Each criterion component comprises one or more opcodes (or functions in general), e.g. OP_CHECKSIGVERIFY. A criterion component may also comprise one or more data elements, e.g. a hash value. Each criterion component defines a criterion which requires a specific input data item to be satisfied. That is, each criterion component, when run against an input script of a later transaction, requires that input script to include a specific data item in order for the criterion component to successfully execute, i.e. return a value representing "TRUE", e.g. <1>. For example, some or all of the criterion components may require a different digital signature to be provided as an input data item. Preferably, each criterion component may define a different criterion. Alternatively, one or more of the criterion components may define the same criterion.

Alice 103a also includes, in the output script, a plurality of counter script components. Each counter script component is associated with a respective one of the criterion components. For instance, each counter script component may, in the case of a scripting language where the script is executed from left to right, follow a respective one of the criterion components. Each counter components comprises one or more opcodes (or functions) and, optionally, one or more data items. Each counter component is configured to increment a counter if its associated criterion component has been satisfied. That is, if a first criterion component is satisfied, a first counter component will increment the counter. Note here that "increment" may be taken to be mean increase or decrease. For instance, the counter may be incremented in an increasing manner (e.g. one, two, three, etc.) or the counter may be incremented in a decreasing manner (e.g. three, two, one, etc.). In some examples, each counter component may increment the counter by the same amount, i.e. by the same number. For instance, the counter may increase by one each time a criterion component is satisfied. Alternatively, the counter components may be weighted. That is, some counter components may increment the counter by different amounts, i.e. by different numbers. As an example, a first counter component may increment the counter by one, whilst a second counter component may increment the counter by two.

Alice 103a constructs the output script such that the counter must reach at least a predetermined number (or threshold) for the output to be unlocked. That is, the output script is configured to determine whether the counter has incremented to a predetermined number. If so, the output may be unlocked and redeemed by Bob 103b. If the threshold is not reached, the output will not be unlocked. In the case that the counter is incremented in an increasing manner, the output script is configured to determine whether the counter is equal to or greater than the threshold. Conversely, in the case that the counter is incremented in a decreasing manner, the output script is configured to determine whether the counter is less than or equal to the threshold. The counter script may comprise one or more opcodes and optionally one or more data elements which together perform a check on the counter and successfully evaluate as "TRUE" if the threshold is reached.

In some examples, the total number of criterion components may be more than the threshold number. In other words, it may be possible to increment the counter, by satisfying criterion components, to a number greater than the predetermined number necessary for unlocking the output. Alternatively, each criterion component must be satisfied in order for the output to be unlocked.

Optionally, a given criterion component may be made up of two or more sub-criterion components. Like criterion components, sub-criterion components comprise opcodes and optionally data elements, which together require an input data item of a later transaction to successfully evaluate. As an example, a criterion component may be made up of multiple sub-criterion components, each of which apply a hash function to a respective input data item and compare the resulting hash values to predetermined hash values. If the resulting and predetermined hash values match, the sub-criterion components and therefore the criterion component are satisfied. Note that even if a criterion component comprises multiple sub-components, the counter is incremented only once when the criterion component as a whole is satisfied, not once for each sub-criterion component.

As shown in FIG. 5, Alice 103a may transmit the criteria $Q_n$ to Bob 103b. Note that the criteria $Q_n$ define what is required as input data items to satisfy the criterion components, but not the data items themselves. For instance, a criterion component may require a digital signature, but would not include the digital signature itself. By providing Bob 103b with the criteria $Q_n$, Bob can know what data items he needs to provide. Alternatively, Alice 103a may not provide the criteria to Bob 103b, in which case Bob would need to interpret the criterion components (e.g. a sequence of opcodes) to determine what should be provided as a corresponding data item.

The output script may comprise n criterion components. If the recipient (Bob) satisfies at least m of the n criteria formalised in the locking script he can redeem the full amount of the digital asset being offered by Alice 103a. If he does not satisfy at least m criteria Bob 103b cannot redeem any of the digital asset. The BTP represents an m-of-n criteria threshold where m is fixed and the recipient can only access the digital asset if they satisfy at least m criteria. The protocol is elaborated on below with respect to two individuals Alice 103a and Bob 103b where Alice 103a pays Bob 103b if Bob can satisfy at least m of n criteria. Alice 103a creates a 'binary-pay' transaction (titled bPay) within which exists an output containing an output script that locks the digital asset contained in the output until Bob 103b is able to provide an input script of a spending transaction that includes content that satisfies at least m of then criteria (in some examples, the input script must also comprise Bob's digital signature). The content of Bob's input script would be a composite of multiple sub-units of input data items. Each data item is offered as a solution for a particular criterion.

This protocol achieves its objectives via an output script in the bPay transaction where, given that an input (from Bob) satisfies its corresponding criteria in the bPay output script, it increments a counter (e.g. initialised at zero and incremented by one). The criteria are described as 'corresponding' due to the fact that the intended recipient (Bob) is expected to place the input of interest in a location in the input transaction so that that input is compared against the appropriate criteria in the bPay output script of the bPay transaction. The value of the counter may be stored on a stack, e.g. an ALT stack of the Script language. When an input is successful with respect to its criterion then the current state of the counter is removed (popped) from the ALT stack, placed (pushed) on the main stack, incremented, then popped from the main stack and pushed back unto the alt stack. If the final value of the counter is at least m then the recipient Bob 103b can unlock the bPay output.

An example of the output and input scripts that would satisfy the desired characteristics of the BTP are shown below in $\text{TxID}_{bPay}$ and $\text{TxID}_{spend}$ respectively.

The subsection [Criterion_1] of the locking (output) script represents a criterion (i.e. condition) that the recipient Bob 103b is being asked to satisfy. This could, for instance, ask for the preimage of a hash as shown below.

```
[Criterion_1] = OP_HASH160 H(PreImage) OP_EQUAL
```

The criterion could also represent a 'grouped set of sub-criteria' that, when combined, must evaluate to true.

```
[Criterion_i] = ƒ([Criterion_i_a] Criterion_i_b], ... ,
Criterion_i_t])
```

Even if [Criterion_i] is a composition of multiple sub-criteria, if the combination of all these sub-criteria evaluate to true, the counter is still only incremented by one unit.

| $TxID_{bPay}$ | |
|---|---|
| Inputs | Outputs |
| <sigA> <PubA> | <0> OP_TOALTSTACK (default counter to 0) [Criterion_1] (criteria 1 subscript) OP_IF OP_FROMALTSTACK <1> OP_ADD OP_TOALTSTACK OP_ENDIF (if criteria satisfied pop stack, increment counter, return to stack) [Criterion_2] (criteria 2 subscript) OP_IF OP_FROMALTSTACK <1> OP_ADD OP_TOALTSTACK OP_ENDIF ... [Criterion_n] OP_IF OP_FROMALTSTACK <1> OP_ADD OP_TOALTSTACK OP_ENDIF OP_FROMALTSTACK <M> OP_GREATERTHANOREQUAL (if counter ≥ m) OP_DUP OP_HASH160 <H(PubB)> OP_EQUALVERIFY OP_CHECKSIG (check Bob's signature) |

Note that the text in parentheses are comments and would not actually be included in the transaction.

To unlock the output of bPay the recipient Bob 103b would provide, in the input script of the spending transaction, n pieces of input where at least m of these inputs satisfy at least m of the previously stated criteria. An example spending transaction $TxID_{bpay}$ is shown above.

| $TxID_{Spend}$ | |
|---|---|
| Inputs | Outputs |
| <sigB> <PubB> <input_n> ... <input_2> <input_1> | |

These set of n inputs are placed in the necessary order such that each of the pieces of input is matched and assessed against the intended criteria when the input and output scripts are combined and executed in the stack. e.g.

```
[criterion_2]
<input_2>
```

Similar to criteria subscripts, an <input_i> could also represent a grouped set of inputs.

```
<input_i> = <input_i_a> <input_i_b> ...
<input_i_t>>
```

Given the user's ability to define any criterion, this accomplishes the objectives of the binary threshold protocol, where a threshold of generic criteria must be satisfied in order for an output of a transaction to be spent.

Spectrum Threshold Protocol

The BTP sets a binary threshold for redeeming an amount of a digital asset. The spectrum threshold protocol (STP) sets a range of thresholds, where the amount of the digital asset that can be received by a recipient depends on number of successfully met criteria.

The example systems of FIGS. 1 and 5 may be used to implement the techniques described below. A first party (Alice) 103a constructs a first transaction (referred to as an "sPay transaction") having multiple outputs. Alice 103a constructs each output in a similar manner to the BTP. That is, each output has an output script and each output script includes multiple criterion components and multiple counter components, each associated with a respective one of the criterion components. Each criterion component defines a criterion which can be satisfied with an input data item from an input script of a later transaction. Each counter component is configured to increment a counter if its associated criterion component is satisfied. Each counter component may increment the counter by the same amount (e.g. one). Alternatively, some of the counter components may increment the counter by different amounts. The multiple criterion components and the multiple counter components are defined in a first script condition of each output script. Here, the first script condition is merely a label for the part of the output script comprising the criterion components and the counter components. Note that each output comprises the same criterion components.

Like the BTP, for the STP Alice 103a constructs each output script such that the counter must reach at least a predetermined number (or threshold) for the corresponding output to be unlocked. That is, each output script is configured to determine whether the counter has incremented to a predetermined number. If so, the associated output may be unlocked and redeemed by Bob 103b. If the threshold is not reached, the output will not be unlocked. Unlike the BTP, at least one output script for the STP requires the counter to reach a different predetermined number. That is, some of the output scripts require different thresholds to be met in order to be unlocked.

In some examples, each output script requires a different threshold to be met. In other examples, one or more output scripts may share the same threshold. In some examples, each output may lock a different amount of the digital asset. In other examples, one or more output scripts may lock the same amount of the digital asset. The amount of digital asset may increase with the threshold, i.e. a larger amount of digital asset can be redeemed if more criteria can be satisfied. The increase may or may not be proportional to the number of criteria satisfied.

Like the BTP, for the STP the total number of criterion components may be more than the threshold number. Alternatively, each criterion component must be satisfied in order for the output to be unlocked. Also similar to the BTP, for the STP one or more of the criterion components may be made up of multiple sub-criterion components.

Figure 6:
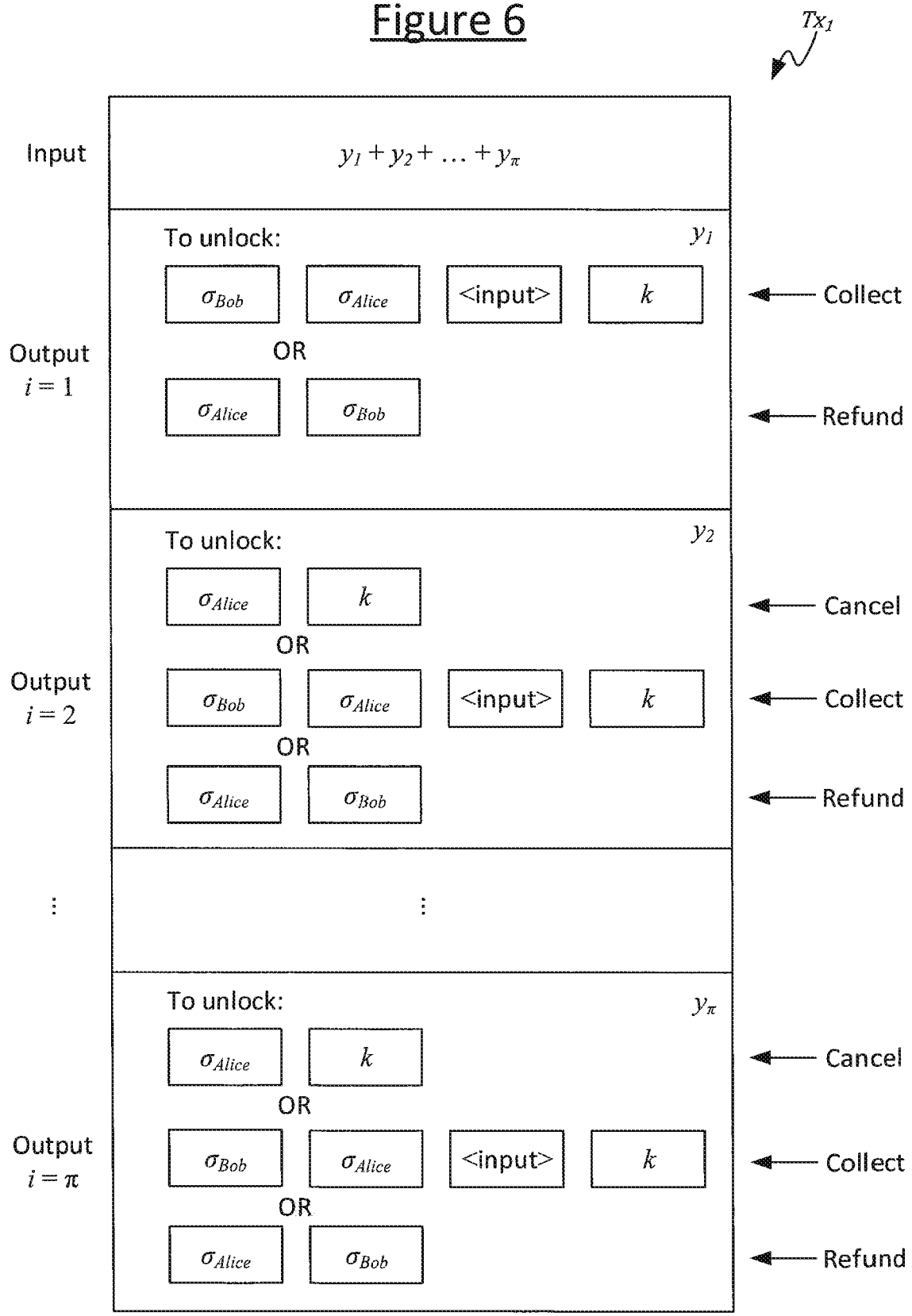
FIG. 6 is a schematic representation of a Spectrum Pay transaction.

FIG. 6 illustrates an example representation of the first transaction $Tx_1$. The first transaction $Tx_1$ has multiple outputs i. In the example shown, each output locks an amount of digital asset $y_i$. That is output 1 locks an amount $y_1$, output 2 locks an amount $y_2$, and output $\pi$ locks an amount $y_\pi$. As shown, the transaction $Tx_1$ comprises an input comprising an amount of the digital asset which is at least equal to the sum of $y_i$.

Note that FIG. 6 illustrates what must be provided in an input script to unlock each output, rather than what it is contained in the output itself. Looking at output 1 of FIG. 6, to unlock output 1, an input script of a second transaction $Tx_2$ may be provided which comprises enough input data items (represented by <input>) to satisfy the threshold for output 1. The second transaction $Tx_2$ is referred to below as a "Collect transaction", as it allows Bob 103b to collect the digital asset $y_1$ locked by output 1. Each first script condition (referred to below as a "Collect condition" may also require the input script of the Collect transaction to comprise Alice and/or Bob's digital signatures, $\sigma_{Alice}$ and $\sigma_{Bob}$ respectively. As another optional feature, the Collect condition may require the Collect transaction $Tx_2$ to comprise a secret value k of Bob's choosing. The secret value is secret in the sense that until the Collect transaction is transmitted to and included in the blockchain 150, the secret value is known only to Bob 103b. For the Collect transaction to require the secret value, Bob 103b must transmit a hash of the secret value to Alice 103a. The Collect condition can then hash the secret value and compare the resulting value with the hash, obtained from Bob 103b, in the Collect condition. Note that there are other ways of unlocking an output of $Tx_1$. These will be described in detail below with reference to "Refund transactions" and "Cancel transactions".

Although for convenience the Collect, Refund and Cancel transactions may be written here with capital letters, this does not necessarily imply any particular proprietary or proper-name, and the terms could equally be written with lower-case letters anywhere herein.

In some examples Alice 103a herself may construct part of the Collect transaction $Tx_2$. For instance, Alice 103a may provide, to Bob 103b via a side channel (e.g. the side channel 301 shown in FIG. 3), a partial transaction comprising her digital signature $\sigma_{Alice}$. Alice 103a may construct such a partial transaction for each of the outputs in the first transaction $Tx_1$. Alice 103a may include a lock time in the partial Collect transaction(s) which she constructs and sends to Bob 103b via the side channel. The lock time prevents the Collect transaction from being successfully included in a block of the blockchain 150 until after a certain time (which may e.g. be specified by a Unix time or a block height). The lock time may be implemented using an "nLocktime" field of the transaction. nLocktime is a parameter of a transaction that mandates a minimal time before which the transaction cannot be accepted into a block. Each Collect transaction may specify a different lock time, as discussed below.

When constructing the first transaction $Tx_1$, Alice 103a may include a second script condition in each output script. The second script condition will be referred to below as a "Refund condition". Like the Collect condition, the Refund condition is a label for a part of the output script and comprises one or more opcodes (or functions in general). The Refund condition may also comprise one or more data elements. The Refund condition is configured to require an input script of a later transaction to comprise Alice's digital signature and Bob's digital signature. That is, the Refund condition determines whether Alice's and Bob's digital signatures have been provided in an input script of a "Refund transaction", and if so, the Refund condition evaluates to TRUE (or <1>), e.g. on the stack.

Each output is constructed such that an input script of a later transaction can satisfy one script condition only. That is, any given input script cannot satisfy both a Collect condition and a Refund condition. This is because the Collect and Refund conditions require different input data items to be unlocked. For example, the Collect condition requires input data items which satisfy the criterion components whereas the Refund condition does not.

In some examples Alice 103a herself may construct part of the Refund transaction. For instance, Alice 103a may provide, to Bob 103b via a side channel (e.g. the side channel 301 shown in FIG. 3), a partial transaction comprising her digital signature $\sigma_{Alice}$. Alice 103a may construct such a partial transaction for each of the outputs in the first transaction. Alice 103a may include a lock time in the partial Refund transaction(s) which she constructs and sends to Bob 103b via the side channel. Bob 103b may then include his signature $\sigma_{Bob}$ in the partial Refund transaction and return the signed Refund transaction to Alice 103a. It will be appreciated that in alternative examples, Bob 103b may first sign a partial Refund transaction and send it to Alice for Alice to sign.

Like the Collect transactions, Alice 103a may set a lock time for each of the Refund transactions. The lock time may be set before Alice and/or Bob sign the transaction with their respective signatures. For each output having associated Collect and Refund transactions, the lock time of the Refund transaction will be later than the lock time of the Collect transaction, meaning that the Collect transaction can be included in a block of the blockchain 150 before the associated Refund transaction.

The Refund condition and Refund transactions together are intended to allow Alice 103a to redeem the amount of the digital asset in each output not claimed by Bob 103b. As an example, if Bob does not manage to provide an input satisfying the criteria threshold of any output (e.g. within a predetermined period of time), Alice 103a needs to be able to reclaim (or Refund) the digital asset tied to the outputs.

When constructing the first transaction $Tx_1$ Alice 103a may include a third script condition in some or all of the output scripts. The third script condition will be referred to below as a "Cancel condition". Like the Collect and Refund conditions, the Cancel condition is a label for a part of the output script and comprises one or more opcodes (or functions in general). The Cancel condition may also comprise one or more data elements. The Cancel condition is configured to require an input script of a later transaction to comprise Alice's digital signature. That is, the Cancel condition determines whether Alice's digital signature has been provided in an input script of a "Cancel transaction", and if so, the Cancel condition evaluates to TRUE (or <1>), e.g. on the stack. The Cancel condition may also require the secret value k.

The Cancel condition and Cancel transactions together are intended to allow Alice 103a to redeem the amount of the digital asset in each output not claimed by Bob 103b. As an example, if one output required two criteria to be satisfied and another output required three criteria to be satisfied, and Bob 103b could only satisfy two criteria, Alice 103a needs to be able to reclaim (or Refund) the output having an output script that specifies the three-criteria threshold. By requiring a Cancel transaction to comprise the secret value (known only to Bob 103b until revealed on the blockchain), Bob 103b can be sure that Alice 103a cannot cancel any of the transactions until Bob attempts to claim one of the outputs using a Collect transaction.

A spectrum threshold, in the context of the STP, is utilised where the recipient Bob 103b gets paid based on the number of criteria that he is able to satisfy. As per the binary threshold, it does not matter 'which criteria' is satisfied, what matters is the number of criteria that are satisfied.

To achieve the spectrum threshold functionality, the STP utilises a transaction (referred to as an sPay transaction) which includes at least $\pi \le n$ outputs. Each output i pays a certain amount $y_i$ based on the amount of criteria, $m_i$, that Bob is asked to satisfy. The set of $m_i$ values are defined as $$\text{set} = \{m_i : i \in \{1, 2, \ldots, \pi\}, m_i \in \mathbb{N}\}$$

The intention is that if a recipient is able to satisfy $m_i$ criteria, the recipient is able to collect the $y_i$ payment from a dedicated output, output i, of the sPay transaction. While the protocol is suitable for such instances, the payment amount does not necessarily have to be proportional to the number of criteria satisfied. As an example of non-proportionality, if Bob 103b satisfies at least one criterion Bob can redeem 10 units of the digital asset; if at least two criteria are satisfied then 15 units of the digital asset; and if at least three criteria then 25 units of the digital asset.

Furthermore, the threshold criteria payments for the set of outputs can be 'arbitrary', and thus do not necessarily have to be an arithmetic progression and/or follow a defined pattern. Consider an sPay transaction's inclusion of outputs for 'at least $m_a$ criteria', for 'at least $m_b$ criteria', for 'at least $m_c$ criteria', and for 'at least $m_d$ criteria' where $m_a < m_b$ and $m_c < m_d$; and no outputs for threshold values $m_x$, $m_y$, $m_z$ exist in the sPay transaction where $$m_a < m_x < m_b$$

$$m_b < m_y < m_c$$

$$m_c < m_z < m_d$$

'No arithmetic progression' would mean that $y_b - y_a$ does not necessarily have to be equal to $y_d - y_c$. In light of the accommodation of 'arbitrary threshold' criteria for the outputs, recall that although there are n criteria that may be satisfied, there are $\pi \le n$ outputs.

In some examples, each output of the sPay transaction comprises multiple script conditions, e.g. Collect, Refund and Cancel conditions. Each output must include the Collect condition and can optionally include the Refund condition and/or the Cancel conditions. As shown in FIG. 6, output 1 comprises a Collect and Refund condition as it can be satisfied by either a Collect or Refund transaction. Output 2 comprises Collect, Refund and Cancel conditions as it can be satisfied by a Collect, Refund, or Cancel transaction.

The different spending transactions and a description of each transaction is provided below.

Collect Transaction—The Collect transaction (Collect$_i$) is the transaction that pays the winnings ($y_i$) to the recipient (Bob) if Bob satisfies the required criteria threshold for that output i. The input script of the Collect transaction may require one, some or all of: the signature of the payer (Alice), the signature of the recipient (Bob), and a secret value k. This secret value is originally known only to Bob and is only revealed when Bob spends the Collect transaction. The Collect transaction may be time-locked, e.g. the nLockTime field/parameter is assigned a value $t_i$ that prevents the Collect transaction from being successfully submitted to the blockchain 150 before that point in time.

Cancel Transaction—The Cancel transaction (Cancel$_i$) is the transaction that returns the winnings ($y_e$) of output i to the payer (Alice) if Bob has previously submitted a Collect transaction to any another output j where j≠i. The input script of the Cancel transaction requires the signature of the payer (Alice) and, optionally, the secret value k. This secret may be retrieved by Alice from the Collect transaction that Bob had previously submitted to the blockchain 150. This Cancel transaction can be submitted at any point in time by Alice as long as Alice knows k.

Refund Transaction—The Refund transaction (Refund$_i$) is the transaction that returns the winnings ($y_i$) of output i to the payer (Alice) if the recipient (Bob) does not submit to the blockchain 150 a Collect transaction (for that output), e.g. before a specified point in time $t_{i,i+1}$, where $t_i < t_{i,i+1} < t_{i+1}$. The input script of the Refund transaction requires the signature of the payer (Alice) and the signature of the recipient (Bob). The Refund transaction may be time-locked, i.e. that the Refund transaction can only be successfully submitted to the blockchain 150 after the nLockTime field/parameter value $t_{i,i+1}$.

As stated above, the design of the sPay transaction is shown in FIG. 6. The information represented in the figure is focused on the various outputs of the transaction and what it would require to successfully spend each output. In this example, each output i>1 is locked by an output script that allows the recipient to spend the output using three different options. Each of these unlocking options corresponds to a transaction (Refund, Collect, or Cancel). Note, as previously mentioned, that output 1 can be spent using only two options (Refund and Collect). In addition, while not mandatory, the STP is built on the premise or expectation that the more criteria a recipient is able to satisfy, the more the recipient should get paid. In line with this, for the sPay transaction represented in FIG. 6 outputs are ordered (top to bottom) with respect to the amount being paid out (which coincides with the number of criteria to be satisfied for that output.) In the figure the larger output (and therefore number of criteria required) is above an output with lower a lower output.

Figure 7:
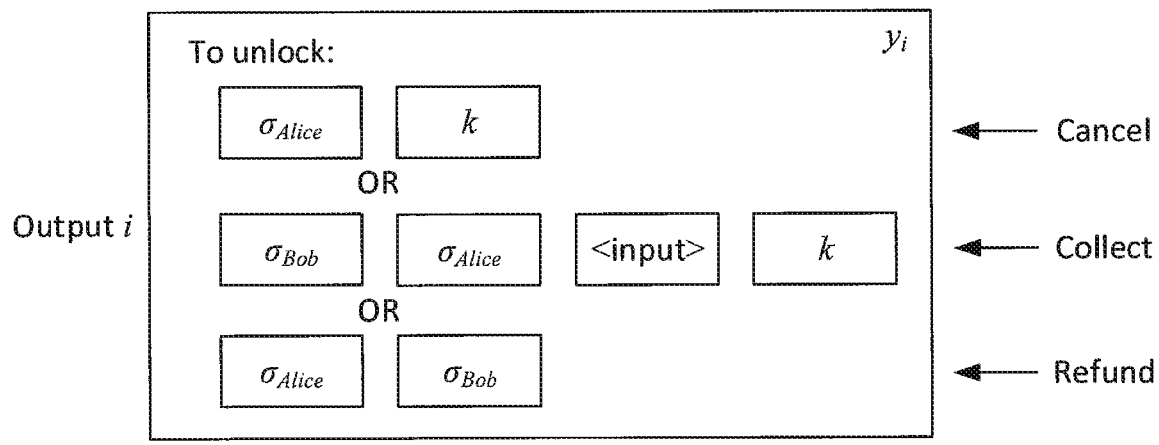
FIG. 7 is a schematic representation of an output of a Spectrum Pay transaction

FIG. 7 illustrates an example output of an sPay transaction for an output i: i≠1. This output can be spent using either the Cancel, Collect, or Refund transactions.

Figure 8:
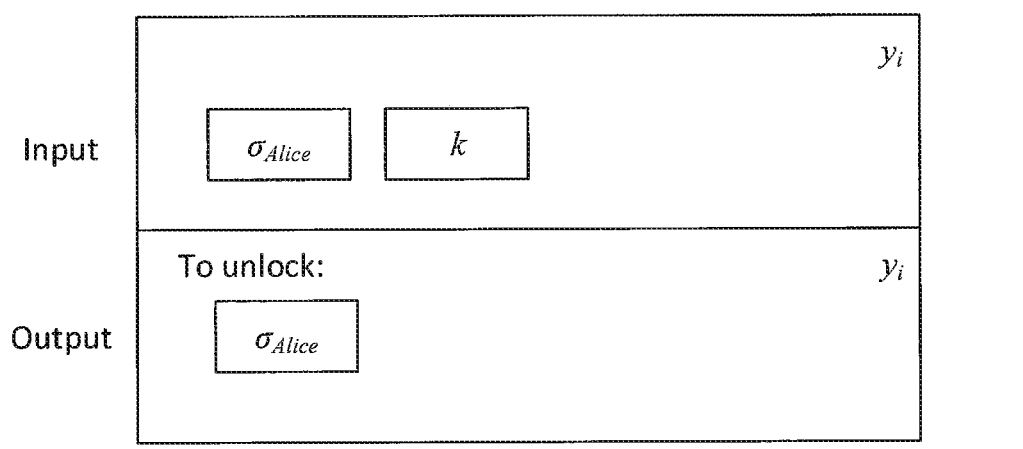
FIG. 8 is a schematic representation of a Cancel transaction.

FIG. 8 illustrates an example Cancel transaction 800. In order to spend the output shown in FIG. 7 utilising the Cancel transaction 800, the payer (expected to be the payer (Alice), must produce her signature as well as the secret value k. The secret value is conceived and originally only known to the recipient Bob 103b. Blockchain scripting languages facilitate the request for an (ECDSA) signature as well the request for the secret value. A hash puzzle may be utilised to request the secret value k. An example of such a locking script that requires both secret value and signature would be

```
OP_HASH160 <H(k)>
OP_EQUALVERIFY
OP_DUP OP_HASH160 <H(PubA)>
OP_EQUALVERIFY OP_CHECKSIG
``` where H(k) is the hash of the secret value k and PubA is a public key owned by payer Alice 103a. A hash is taken to mean the digest of a one-way cryptographic hashing function such as SHA-256. A typical hash function takes an input of arbitrary size and produces an integer in a fixed range. For example, the SHA-256 hash function gives a 256-bit number as its output hash digest.

This script is referred to as a Cancel condition ([Condition: $Can_i$]). The unlocking script (in the Cancel transaction) would be

```
<sigA> <PubA> <k>
``` where sigA is the (ECDSA) signature of the Cancel transaction utilising the public key PubA. This script is referred to as a Cancel input (<Input: $Can_{e>}$).

FIG. 9 illustrates an example Refund transaction 900. In order to spend the output shown in FIG. 7 utilising the Refund transaction 900, the payer (Alice) must produce her signature sigA and the recipient Bob 103b must also provide his signature sigB. The Refund transaction 900 must be signed by both payer and recipient; this is to ensure a mutual agreement that the Refund transaction is constructed as it should, with particular attention paid to the required inclusion of an nLockTime value (i.e. a lock time 901) that prevents the Refund transaction 900 from being valid until after an agreed-upon point in time. An example of a script that would require both signatures would be

```
OP_DUP OP_HASH160 <H(PubA)>
OP_EQUALVERIFY
OP_CHECKSIG OP_DUP
OP_HASH160 <H(PubB)>
OP_EQUALVERIFY OP_CHECKSIG
```

This script is referred to as a Refund condition ([Condition: $Ref_i$]). A 2-of-2 (m-of-n) multisig script could be utilised instead.

The unlocking script (in the Refund transaction 900) would be

```
<sigB> <PubB> <sigA> <PubA>
```

This script is referred to as a Refund input (<Input: $Ref_i$).

FIG. 10 illustrates an example of a Collect transaction 1000. in order to spend the output of FIG. 7 utilising the Collect transaction 1000 at least four items must be provided. The payer (Alice) must produce her signature (sigA) whereas the recipient Bob 103b must provide his signature (sigB) as well as the secret value k. In addition, Bob 103b must provide the inputs,

```
<answers> = <input_n> ...
            <input_2> <input_1>
``` from which there are expected to be enough 'correct' input data items to satisfy the required $m_i$, criteria for that output. The Collect transaction 1000 includes an nLockTime value (i.e. a lock time 1001) that prevents the Collect transaction 1000 from being valid until after an agreed-upon point in time. An example of a script that would require the four pieces of data would be:

```
OP_HASH160 <H(k)> OP_EQUALVERIFY OP_DUP OP_HASH160 <H(PubA)>
OP_EQUALVERIFY OP_CHECKSIG OP_DUP OP_HASH160 <H(PubB)>
OP_EQUALVERIFY OP_CHECKSIG [TEST $m_i$]
```

This script is referred to as a Collect condition ([Condition: $Col_i$]). A 2-of-2 (m-of-n) multisig script could be utilised instead. The section [TEST $m_i$] acts as a representation of the script subsection that: defines the entire set of criteria that the user must satisfy, increments the counter for each criterion satisfied, and verifies that the number of criteria satisfied is correct ($\geq m_i$). This [TEST $m_i$] script subsection would be similar to the output script shown in $TxID_{bPay}$ and is duplicated below, where $<m_e>$ represents the threshold for output i.

Note that the lock time restriction is not represented in the script but in the nLockTime field of the Collect transaction 1000.

[TEST $m_i$]:

```
<0> OP_TOALTSTACK
[criterion_1]
OP_IF OP_FROMALTSTACK <1> OP_ADD OP_TOALTSTACK OP_ENDIF
[criterion_2]
OP_IF OP_FROMALTSTACK <1> OP_ADD OP_TOALTSTACK OP_ENDIF
...
[criterion_n]
OP_IF OP_FROMALTSTACK <1> OP_ADD OP_TOALTSTACK OP_ENDIF
OP_FROMALTSTACK <$m_i$> OP_GREATERTHANOREQUAL
```

The unlocking script (input script of the Collect transaction 1000) would be

```
<answers> <sigB> <PubB> <sigA> <PubA> <k>
```

This script is referred to as the Collect input (<Input: $Col_i$>. This script contains the signatures of both participants as well as the secret value k. Also visible in the script is the value <answers>. This is the section of the input script that contains multiple data items that are expected to be the solutions that satisfy at least $m_i$ criteria in the [TEST $m_i$] section of the output script of output i of the sPay transaction.

```
<answers> ≡ <input_n> <input_n-1> ... <input_2> <input_1>
```

Each of the sub elements of <answers> are to be arranged in a specific order so that each <input_i> is assessed by the intended [criterion_i] found in the [TEST] script. The element <input_i> is expected to be the recipient (Bob)'s solution to the puzzle criteria defined by the payer Alice in [criterion_i]. Note that similar to the BTP, a criterion could have sub-criteria and an input value can be composed of multiple sub inputs.

With the option of at least three different spending options (Collect, Refund, Cancel) to spend an output i of the sPay transaction, the locking (output) script for said output must incorporate the necessary script elements to facilitate the choice of spending transaction. In order to do this the locking script may makes use conditional elements, e.g. OP_IF, OP_ELSE, etc. An example of such a locking script is shown below

```
[Condition: Col_i]OP_IF (if Collect condition works ->Success)
OP_ELSE [Condition: Ref_i] OP_IF (Else try Refund. If Refund works->Success)
OP_ELSE [Condition: Can_i] OP_IF (Else try Cancel. If Cancel works->Success)
OP_ELSE 0 (if none work. Failure)
OP_ENDIF OP_ENDIF
```

Note that the text in parentheses are comments and would not actually be included in the transaction.

Here the script contains the three conditions [Condition: $Col_i$], [Condition: $Ref_i$], and [Condition: $Can_i$]; each governs a particular spending transaction. These conditions are the locking scripts previously described. To successfully spend the sPay output the proposed recipient Bob 103b must include the correct input necessary for their intended spending transaction type. The input script that decides the spending transaction type would have at least three subsections (see cell below). These inputs correspond to those previously described and are shown in cell below

```
<Input: Can_i> <Input: Ref_i> <Input: Col_i>
```

If the recipient Bob 103b is submitting a particular type of spending transaction e.g. Collect 1000, then Bob 103b is expected to have the appropriate script subsection <Input: $Col_i$>be included in that three-part input script and replace the other two input elements with 'dummy data'. Represented as <dummy> for our purposes, dummy data is defined as input data that intentionally evaluates to 'incorrect' when evaluated against a [Condition]. Thus, if Bob 103b wants to submit the Collect transaction 1000 then the input script of the Collect transaction would resemble

```
<dummy> <dummy> <Input: Col_i>
```

Figure 11:
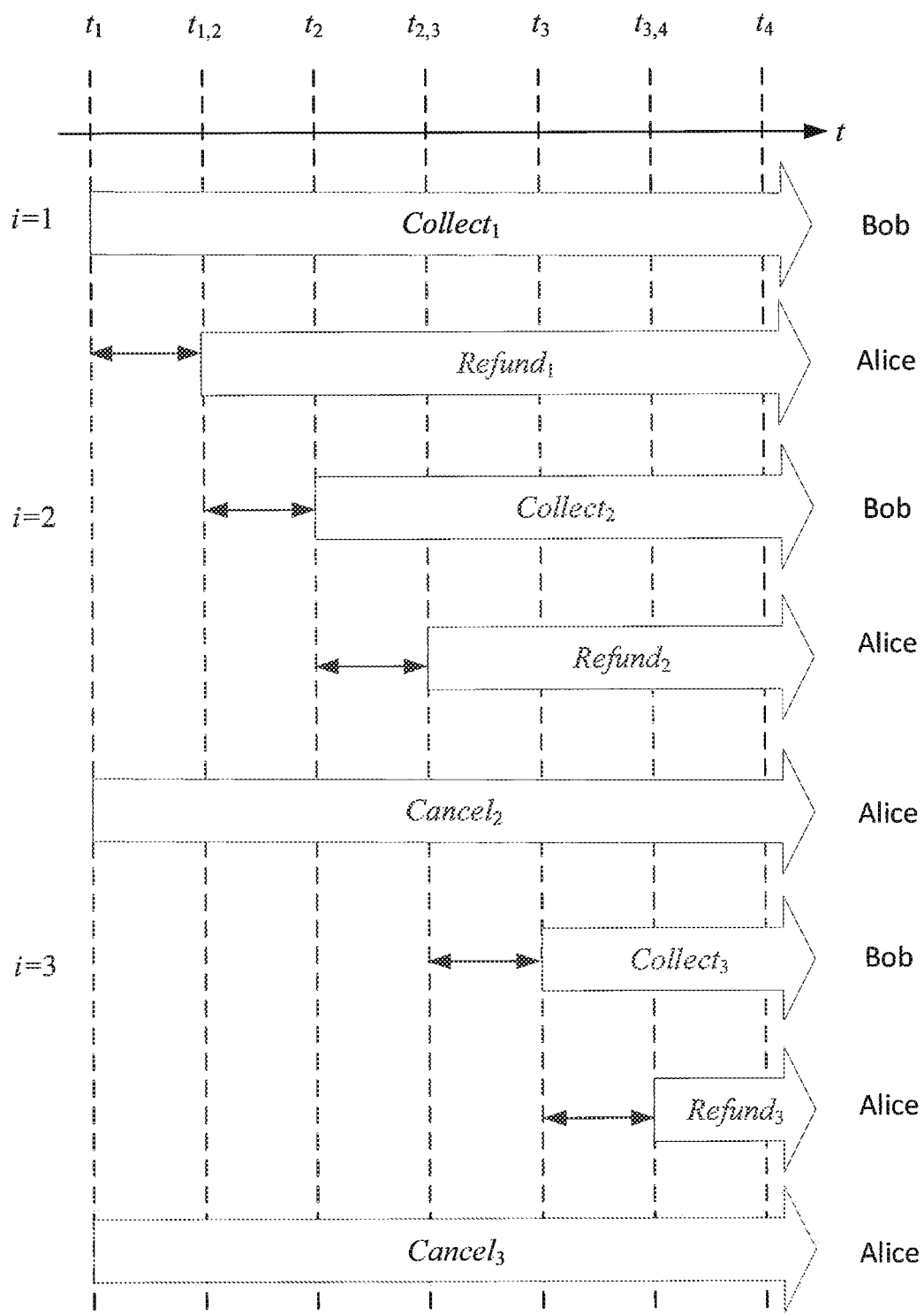
FIG. 11 schematically illustrates an example sequence of time-staggered transactions.

FIG. 11 illustrates an example time-staggering of transactions according to the STP. A potential vulnerability of 'a transaction that has multiple outputs where each output pays based on the $m_i$ of n criteria that a proposed recipient is able to satisfy' is captured within the statement "if a recipient knows at least $m_i$ of n solutions, then that proposed recipient knows $m_i-1$ solutions, $m_i-2$ solutions, ..., 2 solutions, or 1 solution." This translates to the recipient being able to spend multiple outputs of the sPay transaction. This of course is highly undesirable. Lock times and time-staggering can be used to prevent such abuse. This time-staggering may be enabled via the nLockTime field of transactions and works to ensure that the recipient can only submit a Collect transaction to only one output of the sPay transaction.

The time-staggering of the spending transactions is explained using the design shown in FIG. 11. Time is shown on the horizontal axis, left to right. Spending transactions are shown as full-bodied arrows, where the tail of the arrow begins at the time (at or after) that the transaction may be successfully submitted to the blockchain 150, as restricted by the lock time placed on a transaction. As an example, the Collect transaction $Collect_1$ must be submitted after time=$t_1$, whereas Collect transaction $Winning_2$ must be submitted after time=$t_2$, etc. The intended recipient of the spending transaction is shown at the head of the arrow. A Cancel transaction is not time dependent (within this context this means that the Cancel transaction's submission is not restricted by an nLockTime value). The Cancel transactions can be submitted to the blockchain 150 at any time—as long as the secret value of k (and Alice's signature) is known by the submitter. Output i=1 does not have a Cancel transaction. A Cancel transaction for any output j is utilised to give Alice 103a the ability to immediately 'cancel' the $Collect_j$ transaction. $Collect_j$ is only submissable after the collect transaction of an output i is submitted. Since $Collect_1$ has no 'previous' $Collect_j$, it follows that a Cancel transaction to output i=1 is inapplicable. Bearing in mind that a $Refund_1$ transaction exists for output i=1 if Bob never submits his $Collect_1$ transaction. Note that the submission of a Collect transaction to the blockchain 150 reveals the value k to any interested party.

According to FIG. 11, the first transaction $Tx_1$ that may be submitted is that of $Collect_1$ of output i=1. This can be submitted by Bob after time $t_1$. For output i=1 the refund transaction $Refund_1$ can only be submitted (by Alice) at time $t_{1,2}$ (which is a time after time $t_1$ but before time $t_2$). Thus, after time $t_1$, Bob has time span $\Delta_1=t_{1,2}-t_1$ units of time to submit the Collect transaction $Collect_1$ (lest Alice refunds the output to herself). This time span is represented by the two-headed arrows.

The next Collect transaction 1000 that may be submitted is $Collect_2$ ... which may only be submitted after time $t_2$. This means that if Bob 103b wants to collect the winnings for this second output i=1, he can only submit this transaction after $t_2$ which is after the time $t_{1,2}$ the time (at or after) Alice 103a may submit the refund transaction Refund, for output i=1.

The provides protection against Bob 103b collecting multiple outputs of the sPay transaction. The person funding the pay transaction sPay (Alice) has the responsibility of executing the refund transaction $Refund_1$ before the recipient has the ability to submit the Collect transaction $Collect_2$. Thus, after $t_{i,i+1}$, Alice has $\Delta_{i,i+1}=t_{i+1}-t_{i,i+1}$ units of time to submit the Refund transaction $Refund_1$ (lest Bob be able to submit $Collect_{i+1}$).

Output i=1 is an exception in that it does not have a Cancel transaction. To explore the Cancel transaction, look at a generic output i: i>1 of FIG. 11. A Cancel transaction $Cancel_i$ performs the functionality of a refund, with the exception that, as opposed to a refund transaction $Refund_i$, the Cancel transaction's submission to the blockchain 150 is not restricted by an nLockTime value but by knowledge (or lack thereof) of the secret value. As long as the secret value is k is known, Alice 103a can submit this Cancel version of a 'refund' transaction. In some examples, the inclusion of Alice's signature in this transaction is also required. Given that this secret value is revealed when Bob 103b submits a Collect transaction, if Bob 103b were to submit the Collect transaction Collect, then every Cancelsubmission in subsequent outputs j:j>i may then immediately be submitted by Alice 103a. This renders all subsequent outputs as inaccessible to Bob 103b.

The proposed recipient Bob 103b thus has the responsibility to assess (off block) which of the outputs he can successfully spend and that he is willing to submit. The output selected is expected to be the one that would reward Bob with the most amount of the digital asset. If Bob 103b selects an output i then Bob has to keep the value k secret until he submits the transaction Collect$_i$. For any prior output (j<i) Alice would have submitted (or at least had the opportunity to) submit the Refund transaction Refund $_j$.

Whilst preferable, lock times and time-staggering are not essential. Instead, Alice 103a may simply submit the Cancel and/or Refund transactions at an appropriate time. Similarly, Bob 103b may be trusted to only submit a single Collect transaction.

Figure 12:
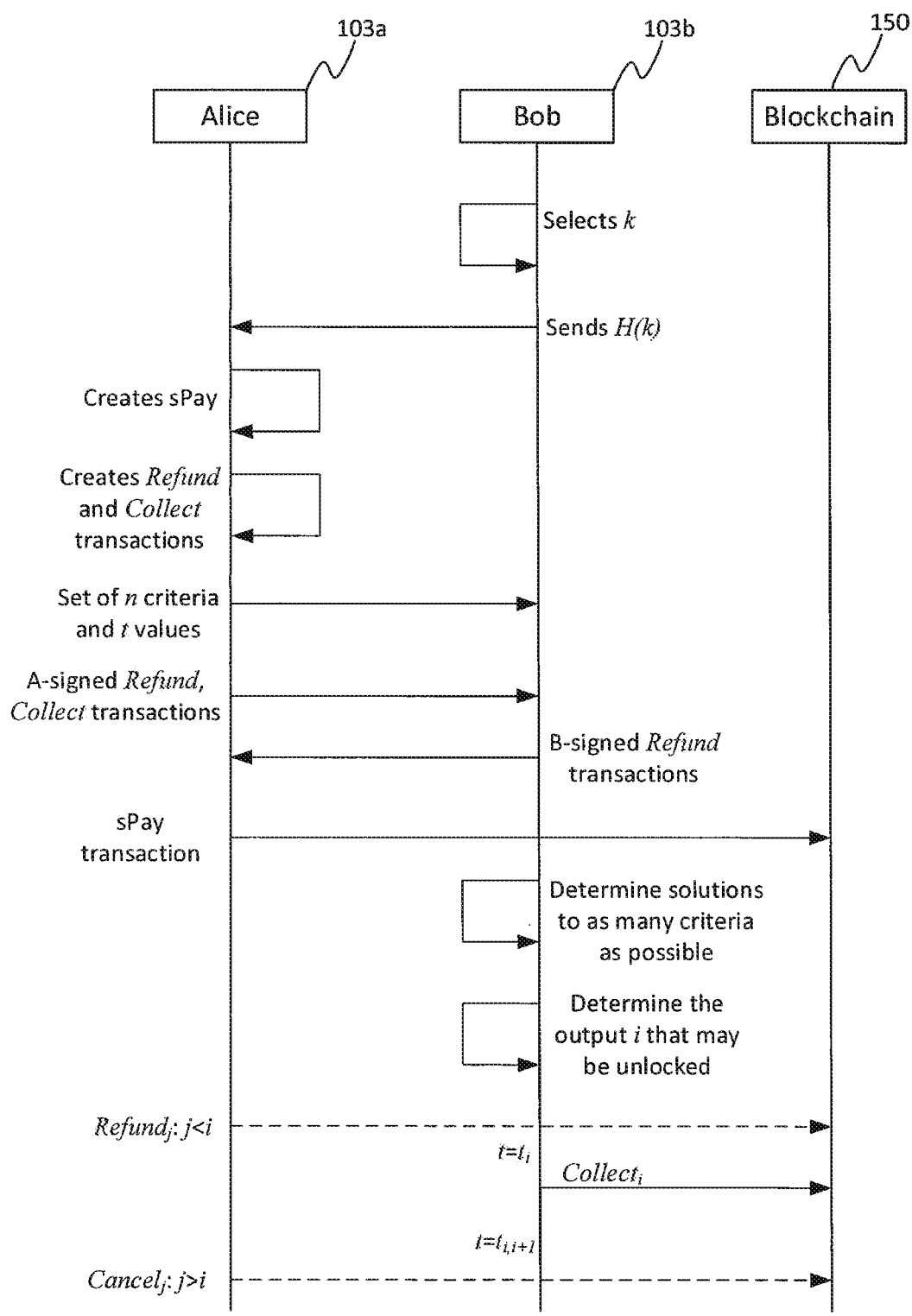
FIG. 12 also schematically illustrates a timeline showing an example sequence of steps taken by different parties to implement a generic criteria threshold blockchain protocol.

FIG. 12 illustrates an example sequence for the STP, with time running from top to bottom. The sequence is as follows:
1. Bob selects a secret value k.
2. Bob sends a hash of the secret value to Alice.
3. Alice creates the sPay transaction.
4. Alice creates the Refund and Collect transactions.
5. Alice sends the set of criteria and lock times to Bob.
6. Alice signs the Refund transactions and Collect transactions and sends them to Bob.

essary in certain contexts where certain criteria are more 'important' than others. Weighted criteria may be used where the amount rewarded for satisfying a criterion is not mandatorily uniform but is dependent on what the criterion is.

Satisfying a criterion i increments the counter by $w_i$ where $w_i$, $\in \mathbb{N}$. The threshold is set at a value $m_t$: $m_t \leq v$, where $v \geq n$ is the maximum achievable (counter) value, e.g. satisfying criterion_i may increment the counter by 2, satisfying criterion_j may increment the counter by 1, whereas satisfying criterion_k may increment the counter by 3, etc.

In such implementations, arriving at the threshold is not bound only to the number of criteria satisfied, but also on what criteria are satisfied. Bob 103b may arrive at the threshold satisfying a varying number of criteria. As an example, if the threshold value is set as six, Bob 103b may achieve the threshold by satisfying three criteria where the weight of each is worth two units, or Bob 103b may achieve the threshold by satisfying two criteria where the weight of each is worth three units.

Both the BTP and the STP can be designed to incorporate this weighted consideration by simply changing the value that the counter held in the alt stack is incremented by in the [TEST] script to now be $w_i$ for each criterion i. The threshold value $<m_t>$ remains the payer's choice and is chosen in consideration to the criteria and their weights.

```
<0> OP_TOALTSTACK
[criterion_1]
OP_IF OP_FROMALTSTACK <w1> OP ADD OP_TOALTSTACK OP_ENDIF
[criterion_2]
OP_IF OP_FROMALTSTACK <w2> OP_ADD OP_TOALTSTACK OP_ENDIF
...
[criterion_n]
OP_IF OP_FROMALTSTACK <wn> OP ADD OP_TOALTSTACK OP_ENDIF
<mt> OP_FROMALTSTACK OP_ GREATERTHANOREQUAL
```

40

7. If Bob agrees, Bob signs the Refund transactions and sends them back to Alice.
8. Alice submits the sPay transaction to the blockchain.
9. Bob determines solutions to as many criteria as possible.
10. Bob determines the output which he can unlock which pays the most amount of the digital asset.
11. As this point, Alice may submit a Refund to the blockchain for any output j<i.
12. Bob submits a Collect transaction for output i to the blockchain.
13. Now that the secret value has been revealed, Alice submits Cancel transactions for outputs j>i.

Note that the above sequence is one particular example and other orderings are possible. For instance, there is some flexibility in when the criteria are presented to Bob.

As discussed above, in some implementations of the binary and spectrum threshold protocols, successfully satisfying a criterion increments the counter by 1, or in other implementations the counter may be incremented by another value. A "weighted criteria" implementation may be e nec- For the [TEST] script shown so far (weighted and otherwise) there are improvements that can be made to improve the efficiency of its execution. The following describes at least one improvement. The efficiency improvement is made by reducing the number of input-criterion assessment (I-CA) that are made. For the previous version of the [TEST] script, each of n inputs are assessed against its corresponding criteria; this means that n I-CAs are always done. This may be problematic if the input-criterion assessment is particularly computationally expensive.

The previous version of [TEST] and the corresponding set of inputs of an unlocking script is based on the idea that the recipient Bob 103b may or may not know which of the inputs would be able to satisfy the input's corresponding criterion; as such the locking script determines which are correct while updating a counter accordingly. However, it is possible that Bob 103b would, in advance of submitting the Collect transaction, know which m of the n criteria he is able to satisfy. The [TEST] script can be reworked such that it asks of the Bob 103b to specify which criterion it wants to perform an I-CA for.

```
<0> OP_TOALTSTACK
OP_IF [criterion_1] OP_VERIFY
OP_FROMALTSTACK <w1> OP ADD OP_TOALTSTACK OP_ENDIF
```

```
OP_IF [criterion_2] OP_VERIFY
OP_FROMALTSTACK <w_2> OP_ADD OP_TOALTSTACK OP_ENDIF
...
OP_IF [criterion_n] OP_VERIFY
OP_FROMALTSTACK <w_n> OP_ADD OP_TOALTSTACK OP_ENDIF
OP_FROMALTSTACK <m_i> OP_GREATERTHANOREQUAL
```

Note that for the revised [TEST] script an OP_IF element is introduced before each criterion. This if-statement checks an input value from Bob (value 0 or 1) to determine whether Bob wants an I-CA performed for that criterion (1 if YES and 0 if NO). The OP_IF opcode may be replaced with equivalent functions for checking for a specific data element. In general, the [TEST] script may comprise a "check" component configured to check if an input comprises one of two possible data elements. If a first data element is provided, the following script executes and vice versa for a second, different data element.

Also note the introduction of OP_VERIFY. This could be a standalone opcode after the previous elements of criterion script, or it could be that the criterion utilises verify-opcodes throughout.

OP_VERIFY after

```
OP_IF [OP_EQUAL] OP_VERIFY
```

Or VERIFY-opcode

```
OP_IF [OP_EQUALVERIFY]
```

Note that the VERIFY Script element marks a transaction as invalid if top stack value is not true. The top stack value is also removed. If the criterion fails, the VERIFY component immediately makes the entire transaction invalid and no further script execution is conducted. In light of the revised [TEST] of the locking script, the unlocking script in the Collect transaction would also need to be revised. The unlocking script described above includes a section <answers> as shown below

```
<answers> ≡ <input_n> <input_n-1> ... <input_2> <input_1>
```

The efficiency-revised version of this section of input script would feature interspersed first or second data elements (e.g. 0 or 1 values) that indicate whether Bob wants an I-CA performed for a particular criterion. An example of such a revision is shown below

```
<answers> ≡ <input_n> <1> <0>... <0> <input_4> <1> <0> <0>
<input_1> <1>
```

Here Bob 103b knows he can arrive at the required threshold by only providing solutions of criterion 1,4, and n. As such, a value of <1> is placed after the <input_1>, <input_4>, and <input_n> elements. <0> replaces every other <input_i> value that was in the <answers>script. Utilising the revised <answers> as above, the total number of I-CAs done would be 3 rather than n. As such, assuming weight <w_i> is equal to 1 for all i, then only m I-CAs are done for an m-of-n threshold.

Figure 13:
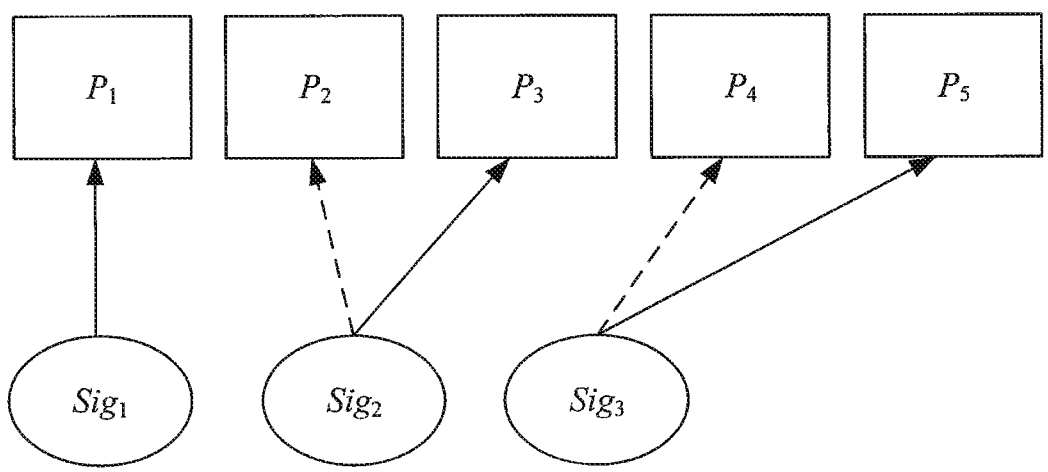
FIG. 13 is a schematic representation of an implementation for checking m-of-n signatures using OP_CHECK-MULTISIG blockchain protocol.
Figure 14:
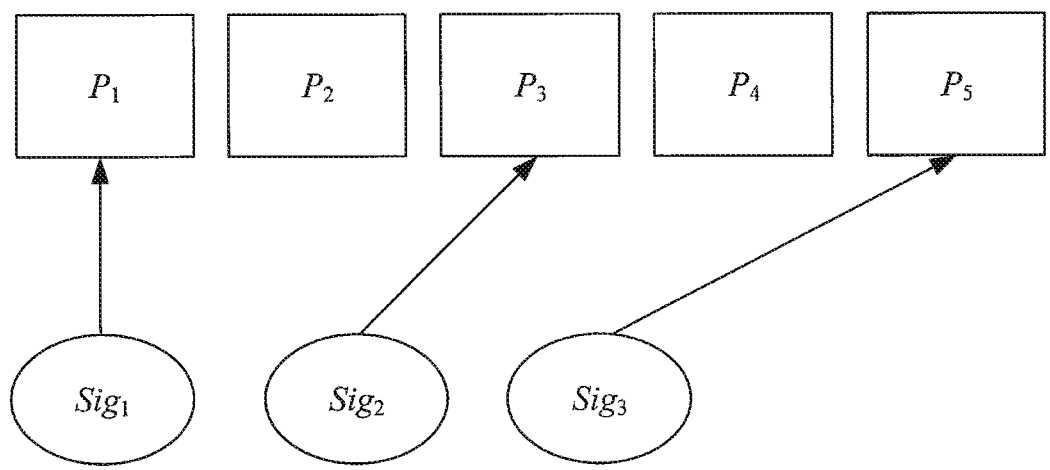
FIG. 14 is a schematic representation of an implementation for checking m-of-n signatures using a generic criteria threshold blockchain protocol.

FIGS. 13 and 14 illustrate an example use-case of the efficiency-improved [TEST] script. The use case is that of an alternative to the current implementation of the m-of-n multisig functionality of some blockchain protocols. For the existing implementation of the m-of-n multisig functionality, via the OP_CHECKMULTISIG, the locking script contains a set of n public keys whereas the unlocking script contains m digital (ECDSA) signatures. The determination of whether signatures meet the threshold is done the following way. The OP_CHECKMULTISIG opcode compares the first signature against each public key until it finds an ECDSA match. Starting with the subsequent public key, it compares the second signature against each remaining public key until it finds an ECDSA match. The process is repeated until all signatures have been checked or not enough public keys remain to produce a successful result. All signatures need to match a public key. Because public keys are not checked again if they fail any signature comparison, signatures must be placed in the scriptSig using the same order as their corresponding public keys were placed in the scriptPubKey. If all signatures are valid, 1 is returned, 0 otherwise.

Consider the 3-of-5 multisig example shown in FIG. 13. Each public key $P_i$, can be seen as a criterion, while each signature $Sig_i$ can be seen as an input. Bearing in mind that a dashed arrow symbolises a failed I-CA and a non-dashed arrow a successful I-CA, it can be seen that there are two I-CAs for assessing $Sig_2$ (similarly for $Sig_3$). Due to the fact that the there is no representation in the script of which public key $P_i$ that $Sig_3$ is to be assessed against, $Sig_3$ has to be assessed, in an ordered sequence against a set of $P_i$s until it either:

a) arrives at a matching $P_i$;
b) exhausts all $P_i$ values without finding a match; or
c) exhausts enough $P_i$ values without finding a match, such that even if it were to eventually find its match in the remaining set of $P_i$s, there would not be enough $P_i$s that remain that would be sufficient to meet the required threshold (even if all remaining of $P_i$s successfully match the remaining $Sig_i$s).

Ultimately, the key takeaway is that for OP_CHECK-MULTISIG, each $Sig_i$ is involved in ≥1 PublicKey-Signature I-CAs. If the efficiency-improved [TEST] function were to be utilised there would be efficiency gains in the number of I-CAs performed. Consider such an m-of-n ECDSA signature [TEST] script as the one proposed below.

```
<0> OP_TOALTSTACK
OP_DUP OP_HASH160 P_1 OP_EQUALVERIFY OP_CHECKSIGVERIFY
OP_FROMALTSTACK <1> OP_ADD OP_TOALTSTACK OP_ENDIF
```

-continued

```
OP_DUP OP_HASH160 P₂ OP_EQUALVERIFY OP_CHECKSIGVERIFY
OP_FROMALTSTACK <1> OP_ADD OP_TOALTSTACK OP_ENDIF
...
OP_DUP OP_HASH160 Pₙ OP_EQUALVERIFY OP_CHECKSIGVERIFY
OP_FROMALTSTACK <1> OP_ADD OP_TOALTSTACK OP_ENDIF
OP_FROMALTSTACK <mᵢ> OP_GREATERTHANOREQUAL
``` and its corresponding unlocking script below where Bob $103b$ provides three signatures $Sig_1$, $Sig_4$, and $Sig_n$,

```
<answers> ≡ <Sigₙ><Pₙ> <1> <0> ... <0> <Sig₄><P₄> <1> <0> <0>
<Sig₁><P₁> <1>
```

Due to the fact that Bob uses the values 0 and 1 to signify what public key a signature is assessed against, this reduces the number of I-CAs each signature is involved with to a maximum of 1 (as opposed to the ≥1 of OP_CHECKMULTISIG), as illustrated in FIG. 14.

An additional advantage of utilizing the [TEST] function (both the previously presented version and the efficiency-improved version) is a privacy gain. By utilising the [TEST] function for m-of-n multisig instead of OP_CHECKMULTISIG, Bob $103b$ does not have to reveal any public keys. This is due to the fact that the OP_CHECKMULTISIG locking script comprises the public keys whereas the [TEST] locking script comprises the hashes of the public keys.

Conclusion

It will be appreciated that the above embodiments have been described by way of example only.

More generally, according to a first instantiation of the teachings disclosed herein there is provided a computer-implemented method of generating a transaction for a blockchain, the transaction being for transferring an amount of a digital asset from a first party to a second party; the method being performed by the first party and comprising: generating a first transaction comprising an output locking the amount of the digital asset, the output comprising an output script comprising a plurality of criterion components each requiring a respective input data item, and a plurality of counter script components, each criterion component being associated with one of the counter script components, and wherein the output script is configured so as to, when executed alongside an input script of a second transaction, i) increment a counter each time a respective criterion component is satisfied by a respective input data item of the input script, and ii) to require the counter to increment to at least a predetermined number in order to be unlocked by the input script.

According to a second, optional instantiation of the teachings disclosed herein, there is provided a method in accordance with the first instantiation, wherein a total number of the plurality of criterion components is greater than or equal to the predetermined number.

According to a third, optional instantiation of the teachings disclosed herein, there is provided a method in accordance with the first or second instantiations, wherein one, some or all of the plurality of criterion components define a different respective criterion.

According to a fourth, optional instantiation of the teachings disclosed herein, there is provided a method in accordance with any of the first to third instantiations, wherein one, some or all of the plurality of criterion components comprises a plurality of sub-criterion components each requiring respective sub-input data item.

According to a fifth, optional instantiation of the teachings disclosed herein, there is provided a method in accordance with any of the first to fourth instantiations, wherein one, some or all of the plurality of criterion components and/or one, some or all of the plurality of sub-criterion components require, as input or sub-input data items respectively, a respective blockchain signature corresponding to a predetermined blockchain public key.

According to a sixth, optional instantiation of the teachings disclosed herein, there is provided a method in accordance with any of the first to fifth instantiations, wherein one, some or all of the plurality of criterion components are associated with a counter script component that is configured to increment the counter by a different number.

According to a seventh, optional instantiation of the teachings disclosed herein, there is provided a method in accordance with any of the first to sixth instantiations, wherein each input data item in the input script comprises either a first or a second element, and wherein one, some or all of the plurality of criterion components are associated with a respective check component, wherein each respective check component is configured so as to, when executed alongside the input script, i) determine whether each input data item comprises the first element, and ii) only execute the associated criterion component if the input data item comprises the first element.

According to an eighth, optional instantiation of the teachings disclosed herein, there is provided a method in accordance with the seventh instantiation, wherein each output script is configured to invalidate the first transaction if an executed criterion component is not satisfied by input data of the input script.

According to a ninth, optional instantiation of the teachings disclosed herein, there is provided a method in accordance with any of the first to eighth instantiations, comprising transmitting the respective criterion and/or sub-criterion to the second party.

According to a tenth, optional instantiation of the teachings disclosed herein, there is provided a method in accordance with any of the first to ninth instantiations, comprising transmitting the first transaction to one or more nodes associated with the blockchain for inclusion in the blockchain.

According to an eleventh instantiation of the teachings disclosed herein there is provided computer equipment of the first party, comprising: memory comprising one or more memory units; and processing apparatus comprising one or more processing units, wherein the memory stores code arranged to run on the processing apparatus, the code being configured so as when on the processing apparatus to perform the method of any of the first to tenth instantiations.

According to a twelfth instantiation of the teachings disclosed herein there is provided a computer program embodied on computer-readable storage and configured so as, when run on computer equipment of the first party, to perform the method of any of the first to tenth instantiations.

According to a thirteenth instantiation of the teachings disclosed herein there is provided a first transaction for inclusion in a blockchain, the first transaction for transferring an amount of a digital asset from a first party to a second party, the first transaction being embodied on a computer-readable data medium or media and comprising executable code, the code comprising a plurality of criterion components each requiring a respective input data item, and a plurality of counter components, each criterion component being associated with one of the counter components, and wherein the code is configured so as to, when executed alongside an input script of a second transaction at a node of a blockchain network: increment a counter, stored in memory of the node, each time a respective criterion component is satisfied by a respective input data item of the input script; and transfer the amount of the digital asset to the second party based on the counter being incremented to at least a predetermined number.

According to a fourteenth instantiation of the teachings disclosed herein there is provided a computer-implemented method of generating a transaction for a blockchain, the transaction being for transferring an amount of a digital asset from a first party to a second party, the first and second parties each being associated with the blockchain; the method being performed by the first party and comprising: generating a first transaction comprising a plurality of outputs, each output locking a respective amount of the digital asset and comprising a respective first script condition, wherein each first script condition comprises a plurality of criterion components each requiring a respective input data item, and a plurality of counter components, each criterion component being associated with one of the counter components, and wherein each first output script condition is configured so as to, when executed alongside an input script of a second transaction, i) increment a counter each time a respective criterion component is satisfied by a respective input data item of the input script, and ii) require the counter to increment to at least a respective predetermined number in order to be unlocked by that input script, and wherein one, some or all of the first script conditions require the counter to increment to a different predetermined number.

According to a fifteenth, optional instantiation of the teachings disclosed herein, there is provided a method in accordance with the fourteenth instantiation, wherein one, some or all of the outputs lock a different respective amount of the digital asset.

According to a sixteenth, optional instantiation of the teachings disclosed herein, there is provided a method in accordance with the fifteenth instantiation, wherein the respective amount of the digital asset locked by a respective output is based on the respective predetermined number to which the respective first script condition requires the counter to increment.

According to a seventeenth, optional instantiation of the teachings disclosed herein, there is provided a method in accordance with any of the fourteenth to sixteenth instantiations, wherein to be unlocked by the input script, each first script condition is configured to require the input script to comprise a digital signature of the first party and/or a digital signature of the second party.

According to an eighteenth, optional instantiation of the teachings disclosed herein, there is provided a method in accordance with the seventeenth instantiation, comprising: for each output, generating a respective second transaction, wherein the input script of each second transaction comprises the predetermined signature of the first party; and transmitting each second transaction to the second party.

According to an nineteenth, optional instantiation of the teachings disclosed herein, there is provided a method in accordance with the eighteenth instantiation, wherein each second transaction comprises a different lock time, wherein each respective lock time is configured to prevent the respective second transaction from being included in the blockchain until after a respective predetermined time.

According to a twentieth, optional instantiation of the teachings disclosed herein, there is provided a method in accordance with any of the fourteenth to nineteenth instantiations, wherein each first script condition comprises a hash of a secret value, and wherein to be unlocked by the input script, each first script condition is configured to require the input script to comprise the secret value.

According to a twenty first, optional instantiation of the teachings disclosed herein, there is provided a method in accordance with any of the fourteenth to twentieth instantiations, wherein each output comprises a respective second script condition configured so as to, when executed alongside an input script of a third transaction, require the input script of the third transaction to comprise a predetermined digital signature of the first party and a predetermined digital signature of the second party in order to be unlocked by that input script.

According to a twenty second, optional instantiation of the teachings disclosed herein, there is provided a method in accordance with the twenty first instantiation, comprising: for each output, receiving a respective third transaction from the second party, wherein the input script of each third transaction comprises the predetermined signature of the first party and the predetermined digital signature of the second party.

For example, the first party may sign the third transaction and transmit the signed third transactions to the second party. The second party may then transmit the third transaction to the first party.

According to a twenty third, optional instantiation of the teachings disclosed herein, there is provided a method in accordance with the twenty second instantiation, wherein each third transaction comprises a different lock time, wherein each respective lock time is configured to prevent the respective second transaction from being included in the blockchain until after a respective predetermined time.

According to a twenty fourth, optional instantiation of the teachings disclosed herein, there is provided a method in accordance with the twenty third instantiation when dependent on at least the nineteenth instantiation, wherein each output is associated with a different one of the second transactions and a different one of the third transactions, and wherein for each output, the respective lock time of the third transaction prevents the third transaction from being included in the blockchain until a time later than a time at which the second transaction can be included in the blockchain.

According to a twenty fifth, optional instantiation of the teachings disclosed herein, there is provided a method in accordance with any of the fourteenth to twenty fourth instantiations, wherein one, some or all of the outputs comprise a respective third script condition, wherein each third script condition is configured so as to, when executed alongside an input script of a fourth transaction, require the input script of the fourth transaction to comprise a predetermined digital signature of the first party in order to be unlocked by that input script.

According to a twenty sixth, optional instantiation of the teachings disclosed herein, there is provided a method in accordance with the twenty fifth instantiation when dependent on at least the twentieth instantiation, wherein each third script condition comprises the hash of the secret value, and wherein to be unlocked by the input script of the fourth transaction, each third script condition is configured to require that input script to comprise the secret value.

According to a twenty seventh, optional instantiation of the teachings disclosed herein, there is provided a method in accordance with the twenty sixth instantiation, comprising: obtaining the secret value; for one, some or all of the outputs, generating a respective fourth transaction, wherein the input script of each fourth transaction comprises the predetermined signature of the first party and the secret value; and transmitting each fourth transaction to one or more nodes associated with the blockchain for inclusion in the blockchain.

According to a twenty eighth, optional instantiation of the teachings disclosed herein, there is provided a method in accordance with any of the fourteenth to twenty seventh instantiations, wherein a total number of the plurality of criterion components is greater than each of the respective predetermined numbers.

According to a twenty ninth, optional instantiation of the teachings disclosed herein, there is provided a method in accordance with any of the fourteenth to twenty eighth instantiations, wherein one, some or all of the plurality of criterion components define a different respective criterion.

According to a thirtieth, optional instantiation of the teachings disclosed herein, there is provided a method in accordance with any of the fourteenth to twenty ninth instantiations, wherein one, some or all of the plurality of criterion components comprises a plurality of sub-criterion components each requiring respective sub-input data item.

According to a thirty first, optional instantiation of the teachings disclosed herein, there is provided a method in accordance with any of the fourteenth to thirtieth instantiations, wherein for one, some or all of the first script conditions, one, some or all of the plurality of criterion components and/or one, some or all of the plurality of sub-criterion components require, as input or sub-input data items respectively, a respective blockchain signature corresponding to a predetermined blockchain public key.

According to a thirty second, optional instantiation of the teachings disclosed herein, there is provided a method in accordance with any of the fourteenth to thirty first instantiations, wherein for one, some or all of the first script conditions, one, some or all of the plurality of criterion components are associated with a counter script component that is configured to increment the counter by a different number.

According to a thirty third, optional instantiation of the teachings disclosed herein, there is provided a method in accordance with any of the fourteenth to thirty second instantiations, wherein each input data item in the input script comprises either a first or a second element, and wherein one, some or all of the plurality of criterion components are associated with a respective check component, wherein each respective check component is configured so as to, when executed alongside the input script, i) determine whether each input data item comprises the first element, and ii) only execute the criterion script components corresponding to input data items comprising the first element.

According to a thirty fourth, optional instantiation of the teachings disclosed herein, there is provided a method in accordance with the thirty third instantiation, wherein each first script condition is configured to invalidate the first transaction if an executed criterion script is not satisfied by input data of the input script.

According to a thirty fifth, optional instantiation of the teachings disclosed herein, there is provided a method in accordance with any of the fourteenth to thirty fourth instantiations, comprising transmitting the respective criterions and/or sub-criterions to the second party.

According to a thirty sixth, optional instantiation of the teachings disclosed herein, there is provided a method in accordance with any of the fourteenth to thirty fifth instantiations, comprising transmitting the first transaction to one or more nodes associated with the blockchain for inclusion in the blockchain.

According to a thirty seventh instantiation of the teachings disclosed herein, there is provided computer equipment of the first party, comprising: memory comprising one or more memory units; and processing apparatus comprising one or more processing units, wherein the memory stores code arranged to run on the processing apparatus, the code being configured so as when on the processing apparatus to perform the method of any of the fourteenth to thirty sixth instantiations.

According to a thirty eighth instantiation of the teachings disclosed herein, there is provided a computer program embodied on computer-readable storage and configured so as, when run on computer equipment of the first party, to perform the method of any of the fourteenth to thirty sixth instantiations.

According to a thirty ninth instantiation of the teachings disclosed herein, there is provided a computer-implemented method of generating a transaction for a blockchain, the transaction being for transferring an amount of a digital asset from a first party to a second party, the first and second parties each being associated with the blockchain, wherein the blockchain comprises a first transaction comprising an output locking the amount of the digital asset and comprising a first script condition, wherein the first script condition comprises a plurality of criterion components each requiring a respective input data item; the method being performed by the second party and comprising: generating a second transaction comprising a first input script component, the first input script component comprising: i) a plurality of input data items each corresponding to a respective criterion component of the first script condition, ii) a secret value, iii) a predetermined digital signature of the first party, and iv) a predetermined signature of the second party; and transmitting the second transaction to one or more nodes associated with the blockchain for inclusion in the blockchain.

According to a fortieth, optional instantiation of the teachings disclosed herein, there is provided a method in accordance with the thirty ninth instantiation, wherein the first transaction comprises second and third script conditions, and wherein the second transaction comprises: a second input script component configured to evaluate as false when executed against the second script condition; and a third input script component configured to evaluate as false when executed against the third script condition.

According to a forty first, optional instantiation of the teachings disclosed herein, there is provided a method in accordance with the thirty ninth or fortieth instantiations, wherein the first script condition comprises a plurality of check components, each associated with a respective one of the plurality of criterion components, and wherein each respective check component is configured so as to, when executed alongside the input script, i) determine whether each input data item comprises the first element, and ii) only execute the criterion script components corresponding to input data items comprising the first element; and wherein each input data item comprises either the first data element or a second, different data element.

According to a forty second, optional instantiation of the teachings disclosed herein, there is provided a method in accordance with any of the thirty ninth to forty first instantiations, wherein one, some or all of the input data items comprises a respective digital signature.

According to a forty third instantiation of the teachings disclosed herein, there is provided computer equipment of the second party, comprising: memory comprising one or more memory units; and processing apparatus comprising one or more processing units, wherein the memory stores code arranged to run on the processing apparatus, the code being configured so as when on the processing apparatus to perform the method of any of the thirty ninth to forty second instantiations.

According to a forty fourth instantiation of the teachings disclosed herein, there is provided a computer program embodied on computer-readable storage and configured so as, when run on computer equipment of the second party, to perform the method of any of the thirty ninth to forty second instantiations.

According to a forty fifth instantiation of the teachings disclosed herein, there is provided a first transaction for inclusion in a blockchain, the first transaction for transferring an amount of a digital asset from a first party to a second party, the first transaction being embodied on a computer-readable data medium or media and comprising executable code, the code comprising a plurality of output scripts, each output script locking a respective amount of the digital asset and comprising respective first, second, and third script conditions, each first script condition comprising i) a plurality of criterion components each requiring a respective input data item, and ii) a plurality of counter components, each criterion component being associated with one of the counter components, and wherein the code is configured so as to, when a respective output script is executed alongside an input script of a second transaction at a node of a blockchain network: if the respective first script condition is executed, increment a counter, stored in memory of the node, each time a respective criterion component is satisfied by a respective input data item of the input script, and transfer the amount of the digital asset to the second party based on the counter being incremented to at least a predetermined number; if the respective second script condition is executed, determine if the input script comprises a predetermined digital signature of the first party and a predetermined digital signature of the second party, and transfer the amount of the digital asset to the first party; and if the respective third script condition is executed, determine if the input script comprises the predetermined digital signature of the first party and a secret value, and transfer the amount of the digital asset to the first party.

According to a forty sixth instantiation of the teachings disclosed herein, there is provided a computer-readable storage medium having stored thereon the first transaction of the forty fifth instantiation.

According to a forty seventh instantiation of the teachings disclosed herein, there is provided a computer-readable storage medium having stored thereon the first transaction of the thirteenth instantiation.

According to another instantiation of the teachings disclosed herein, there may be provided a method comprising the actions of the first party and the second party.

According to another instantiation of the teachings disclosed herein, there may be provided a system comprising the computer equipment of the first party and the second party.

According to another instantiation of the teachings disclosed herein, there may be provided a set of transactions comprising the first and second transactions.

Other variants or use cases of the disclosed techniques may become apparent to the person skilled in the art once given the disclosure herein. The scope of the disclosure is not limited by the described embodiments but only by the accompanying claims.

The invention claimed is:

1. A computer-implemented method of generating a transaction for a blockchain, the transaction being for transferring an amount of a digital asset from a first party to a second party; the method being performed by the first party and comprising:

generating a first blockchain transaction comprising an output locking the amount of the digital asset, the output comprising an output script comprising a plurality of criterion components, each criterion component comprising one or more functions and one or more data elements defining a respective criterion that requires a respective input data item to be provided to satisfy the criterion component, and a plurality of respective counter script components, wherein each criterion component is associated with a respective counter script component of the plurality of the respective counter script components, and wherein each respective counter script component comprises one or more functions and is configured to increment a counter if its associated criterion component has been satisfied, and wherein the output script is configured so as to, when executed by a script engine of a blockchain node alongside an input script of a second transaction that has been submitted to the blockchain, i) verify, using the one or more functions, that the input script comprises the respective input data item that satisfies the respective criterion component, and increment the counter each time a respective criterion component is satisfied by a respective input data item of the input script, and ii) to require the counter to increment to at least a predetermined number in order to be unlocked by the input script, wherein the plurality of criterion components require the counter to be incremented by the second blockchain transaction to different predetermined numbers, wherein the counter is implemented using a stack-based memory of a blockchain node, wherein the output script is configured to store the counter on a stack of the stack-based memory and increment the counter on the stack each time the respective criterion component is satisfied; and wherein the output script does not comprise an OP_CHECKMULTISIG opcode.

2. The method of claim 1, comprising transmitting the first blockchain transaction over an internet connection to one or more blockchain nodes associated with the blockchain for inclusion in the blockchain.

3. The method of claim 1, wherein a total number of the plurality of criterion components is greater than or equal to the predetermined number.

4. The method of claim 1, wherein one, some or all of the plurality of criterion components define a different respective criterion.

5. The method of claim 1, wherein one, some or all of the plurality of criterion components comprises a plurality of sub-criterion components each requiring respective sub-input data item.

6. The method of claim 5, wherein one, some or all of the plurality of criterion components and/or one, some or all of the plurality of sub-criterion components require, as input or sub-input data items respectively, a respective blockchain signature corresponding to a predetermined blockchain public key.

7. The method of claim 1, wherein one, some or all of the plurality of criterion components are associated with a counter script component that is configured to increment the counter by a different number.

8. A computer system, comprising:
memories comprising one or more memory units; and
one or more processors comprising one or more processing units, wherein the memory stores code arranged to run on the one or more processors, the code being configured so as when run on the one or more processors, the computer system performs a method of generating a transaction for a blockchain, the transaction being for transferring an amount of a digital asset from a first party to a second party; the method comprising:
generating a first blockchain transaction comprising an output locking the amount of the digital asset, the output comprising an output script comprising a plurality of criterion components, each criterion component comprising one or more functions and one or more data elements defining a respective criterion that requires a respective input data item to be provided to satisfy the criterion component, and a plurality of respective counter script components, wherein each criterion component is associated with a respective counter script component of the plurality of respective counter script components, and wherein each respective counter script component comprises one or more functions and is configured to increment a counter if its associated criterion component has been satisfied;
verifying, using the one or more functions, that the input script comprises the respective input data item that satisfies the respective criterion component, and increment the counter each time a respective criterion component is satisfied by a respective input data item of the input script;
requiring the counter to increment to at least a predetermined number in order to be unlocked by the input script, wherein the plurality of criterion components require the counter to be incremented by the second blockchain transaction to different predetermined numbers;
wherein the counter of the first blockchain transaction is implemented using a stack-based memory of a blockchain node, wherein the output script is configured to store the counter on a stack of the stack-based memory and increment the counter on the stack each time the respective criterion component is satisfied; and
wherein the output script does not comprise an OP_CHECKMULTISIG opcode.

9. A non-transitory computer-readable storage medium comprising a computer program configured so as, when run on a computer system, the computer system performs a method of generating a transaction for a blockchain, the transaction being for transferring an amount of a digital asset from a first party to a second party; the method comprising:
generating, by one or more processors of a computer equipment of the first party, a first blockchain transaction comprising an output locking the amount of the digital asset, the output comprising an output script comprising a plurality of criterion components, each criterion component comprising one or more functions and one or more data elements defining a respective criterion that requires a respective input data item to be provided to satisfy the criterion component, and a plurality of respective counter script components, wherein each criterion component is associated with a respective counter script component of the plurality of respective counter script components, and wherein each respective counter script component comprises one or more functions and is configured to increment a counter if its associated criterion component has been satisfied, and
verifying, using the one or more functions, that the input script comprises the respective input data item that satisfies the respective criterion component, and increment the counter each time a respective criterion component is satisfied by a respective input data item of the input script;
requiring the counter to increment to at least a predetermined number in order to be unlocked by the input script, wherein the plurality of criterion components require the counter to be incremented by the second blockchain transaction to different predetermined numbers;
wherein the counter is implemented using a stack-based memory of a blockchain node, wherein the output script is configured to store the counter on a stack of the stack-based memory and increment the counter on the stack time each the respective criterion component is satisfied; and
wherein the output script does not comprise an OP_CHECKMULTISIG opcode.

10. A non-transitory computer-readable storage medium comprising a computer program configured so as, when run on computer equipment, the computer equipment performs a computer-implemented method of generating a transaction for a blockchain, the transaction being for transferring an amount of a digital asset from a first party to a second party, the first and second parties each being associated with the blockchain; the method comprising:
generating by one or more processors of a computer equipment of the first party a first blockchain transaction comprising a plurality of outputs, each output locking a respective amount of the digital asset and comprising a respective first script condition, wherein each first script condition comprises a plurality of criterion components, each criterion component comprising one or more functions and one or more data elements defining a respective criterion that requires a respective input data item to be provided to satisfy the criterion component, and a plurality of respective counter script components, wherein each criterion component is associated with a respective counter script component of the plurality of respective counter components, and wherein each respective counter script component comprises one or more functions and is configured to increment a counter if its associated criterion component has been satisfied, and
verifying, using the one or more functions, that the input script comprises the respective input data item that satisfies the respective criterion component, and increment the counter each time a respective criterion component is satisfied by a respective input data item of the input script;

requiring the counter to increment to at least a respective predetermined number in order to be unlocked by that input script, and wherein one, some or all of the first script conditions require the counter to increment to a different predetermined number, wherein the script conditions require the counter to be incremented by the second blockchain transaction to different predetermined numbers, wherein the counter is implemented using a stack-based memory of a blockchain node, wherein the output script is configured to store the counter on a stack of the stack-based memory and increment the counter on the stack each time the respective criterion component is satisfied; and wherein the output script does not comprise an OP_CHECKMULTISIG opcode.

11. The non-transitory computer-readable storage medium of claim 10, wherein the computer-implemented method further comprises transmitting the first blockchain transaction over an internet connection to one or more nodes associated with the blockchain for inclusion in the blockchain.

12. The non-transitory computer-readable storage medium of claim 10, wherein some or all of the outputs lock a different respective amount of the digital asset.

13. The non-transitory computer-readable storage medium of claim 10, wherein the respective amount of the digital asset locked by a respective output is based on the respective predetermined number to which the respective first script condition requires the counter to increment.

14. The non-transitory computer-readable storage medium of claim 10, wherein to be unlocked by the input script, each first script condition is configured to require the input script to comprise a digital signature of the first party and/or a digital signature of the second party.

15. The non-transitory computer-readable storage medium of claim 14, wherein the computer-implemented method further comprises:
for each output, generating a respective second transaction, wherein the input script of each second transaction comprises the digital signature of the first party; and
transmitting each second transaction to the second party.

16. The non-transitory computer-readable storage medium of claim 15, wherein each second transaction comprises a different lock time, wherein each respective lock time is configured to prevent the respective second transaction from being included in the blockchain until after a respective predetermined time.

17. The non-transitory computer-readable storage medium of claim 10, wherein each first script condition comprises a hash of a secret value, and wherein to be unlocked by the input script, each first script condition is configured to require the input script to comprise the secret value.

18. The non-transitory computer-readable storage medium of claim 10, wherein each output comprises a respective second script condition configured so as to, when executed alongside an input script of a third transaction, require the input script of the third transaction to comprise a predetermined digital signature of the first party and a predetermined digital signature of the second party in order to be unlocked by that input script.

19. The non-transitory computer-readable storage medium of claim 18, wherein the computer implemented method further comprises:
for each output, receiving a respective third transaction from the second party, wherein the input script of each third transaction comprises the predetermined signature of the first party and the predetermined digital signature of the second party.

20. The non-transitory computer-readable storage medium of claim 19, wherein each third transaction comprises a different lock time, wherein each respective lock time is configured to prevent the respective second transaction from being included in the blockchain until after a respective predetermined time.

21. The non-transitory computer-readable storage medium of claim 20, wherein each output is associated with a different one of the second transactions and a different one of the third transactions, and wherein for each output, the respective lock time of the third transaction prevents the third transaction from being included in the blockchain until a time later than a time at which the second transaction can be included in the blockchain.

22. The non-transitory computer-readable storage medium of claim 10, wherein one, some or all of the outputs comprise a respective third script condition, wherein each third script condition is configured so as to, when executed alongside an input script of a fourth transaction, require the input script of the fourth transaction to comprise a predetermined digital signature of the first party in order to be unlocked by that input script.

23. The non-transitory computer-readable storage medium of claim 22, wherein each third script condition comprises a hash of a secret value, and wherein to be unlocked by the input script of the fourth transaction, each third script condition is configured to require that input script to comprise the secret value.

* * * * *